(12) United States Patent　(10) Patent No.: US 12,308,751 B2
Nishimoto et al.　(45) Date of Patent: May 20, 2025

(54) POWER CONVERSION APPARATUS INCLUDING TRANSFORMER AND OPERABLE WITH REDUCED COMMON MODE NOISE

(71) Applicant: Panasonic Intellectual Property Management Co., Ltd., Osaka (JP)

(72) Inventors: Taiki Nishimoto, Osaka (JP); Noriaki Takeda, Osaka (JP); Naoki Sawada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 200 days.

(21) Appl. No.: 17/631,838

(22) PCT Filed: Jul. 29, 2020

(86) PCT No.: PCT/JP2020/029072
§ 371 (c)(1),
(2) Date: Jan. 31, 2022

(87) PCT Pub. No.: WO2021/024879
PCT Pub. Date: Feb. 11, 2021

(65) Prior Publication Data
US 2022/0278622 A1　Sep. 1, 2022

(30) Foreign Application Priority Data

Aug. 2, 2019　(JP) ................................ 2019-143273
Aug. 2, 2019　(JP) ................................ 2019-143278
Aug. 2, 2019　(JP) ................................ 2019-143279

(51) Int. Cl.
*H02M 3/335*　(2006.01)
*H02M 1/12*　(2006.01)
*H02M 3/00*　(2006.01)

(52) U.S. Cl.
CPC ....... *H02M 3/33573* (2021.05); *H02M 1/123* (2021.05); *H02M 3/01* (2021.05); *H02M 3/33571* (2021.05)

(58) Field of Classification Search
CPC ............. H02M 1/123; H02M 3/33573; H02M 3/33571; H02M 3/01; H02M 3/335
See application file for complete search history.

(56) References Cited

U.S. PATENT DOCUMENTS

2011/0242854 A1　10/2011　Minami et al.
2012/0140525 A1　6/2012　Cuadra et al.
(Continued)

FOREIGN PATENT DOCUMENTS

CN　109643956 A　4/2019
JP　H08-033329 A　2/1996
(Continued)

OTHER PUBLICATIONS

International Search Report issued in International Patent Application No. PCT/JP2020/029072, dated Oct. 6, 2020; with English translation.
(Continued)

*Primary Examiner* — Alex Torres-Rivera
(74) *Attorney, Agent, or Firm* — Rimon P.C.

(57) ABSTRACT

A power conversion apparatus is provided with a transformer, a primary circuit, and a secondary circuit. The primary circuit is connected to a primary winding of the transformer, has a primary positive bus and a primary negative bus, and includes at least one switching element. The secondary circuit is connected to a secondary winding of the transformer, has a secondary positive bus and a secondary negative bus, and includes at least one switching element. The power conversion apparatus is further provided with a coupling circuit including at least a first
(Continued)

capacitor. The power conversion apparatus is configured such that the primary circuit is an unbalanced circuit and the secondary circuit is a balanced circuit, and having the coupling circuit connected between a center tap of the secondary winding of the transformer, and one of the primary positive bus and the primary negative bus.

12 Claims, 21 Drawing Sheets

(56) References Cited

U.S. PATENT DOCUMENTS

| | | | |
|---|---|---|---|
| 2014/0268899 A1* | 9/2014 | Hosotani | H02M 3/33571 363/17 |
| 2017/0012548 A1 | 1/2017 | Sakuno et al. | |
| 2018/0074538 A1 | 3/2018 | Zhang et al. | |
| 2019/0200441 A1* | 6/2019 | Zhu | H02M 1/081 |
| 2019/0319532 A1* | 10/2019 | Wang | H02M 3/33573 |

FOREIGN PATENT DOCUMENTS

| | | |
|---|---|---|
| JP | H11-122909 A | 4/1999 |
| JP | 2004-040923 A | 2/2004 |
| JP | 2007-097303 A | 4/2007 |
| JP | 4672504 B2 | 1/2011 |
| JP | 5633778 B2 | 12/2014 |
| JP | 2017-077078 A | 4/2017 |

OTHER PUBLICATIONS

International Preliminary Report on Patentability dated Feb. 17, 2022 issued in International Patent Application No. PCT/JP2020/029072, with English translation.

Notice of Reasons for Refusal dated Jun. 4, 2024 issued in the corresponding Japanese Patent Application No. 2021-537257, with English machine translation.

Chinese Office Action dated Mar. 19, 2025 issued in the corresponding Chinese Patent Application No. 202080055042.9, with English translation.

* cited by examiner

POWER CONVERSION APPARATUS INCLUDING TRANSFORMER AND OPERABLE WITH REDUCED COMMON MODE NOISE

CROSS-REFERENCE OF RELATED APPLICATIONS

This application is the U.S. National Phase under 35 U.S.C. § 371 of International Patent Application No. PCT/JP2020/029072, filed on Jul. 29, 2020, which in turn claims the benefit of Japanese Application No. 2019-143273, filed on Aug. 2, 2019, Japanese Application No. 2019-143278, filed on Aug. 2, 2019, and Japanese Application No. 2019-143279, filed on Aug. 2, 2019, the entire disclosures of which Applications are incorporated by reference herein.

TECHNICAL FIELD

The present disclosure relates to an isolated power conversion apparatus including a transformer.

BACKGROUND ART

There has been known an isolated power conversion apparatus provided with a transformer, a primary circuit, and a secondary circuit. For example, Patent Document 1 discloses a power conversion apparatus provided with a transformer, an unbalanced primary circuit, and a balanced secondary circuit. In addition, Patent Document 2 discloses a power conversion apparatus provided with a transformer, a balanced primary circuit, and an unbalanced secondary circuit. In addition, Patent Document 3 discloses a power conversion apparatus provided with a transformer, a balanced primary circuit, and a balanced secondary circuit.

In addition, Patent Documents 1 to 3 disclose a resonance circuit made of a primary winding, an inductor, and a capacitor (also referred to as "LLC resonance circuit"), which is configured by providing the inductor and the capacitor between the primary winding of the transformer and the primary circuit. By using such a resonance circuit for soft switching, it is possible to reduce loss and improve power density of the power conversion apparatus.

CITATION LIST

Patent Documents

PATENT DOCUMENT 1: Japanese Patent No. JP 4672504 B
PATENT DOCUMENT 2: Japanese Patent No. JP 5633778 B
PATENT DOCUMENT 3: Japanese Patent Laid-open Publication No. JP 2004-040923 A

SUMMARY OF INVENTION

Technical Problem

In a power conversion apparatus, power is often transmitted in normal mode, and when a part of normal mode power is converted into common mode power, it is observed as common mode noise. In the case of transmitting communication signals, it has been known that when two transmission lines having different degrees of balance are connected to each other, mode conversion occurs at their connection point. If applying these facts to a power conversion circuit provided with an unbalanced circuit and a balanced circuit, which are not matched with each other, it is considered that common mode noise occurs in their connection point. In addition, for a power conversion apparatus, a method is proposed to reduce common mode noise by configuring the entire apparatus with balanced circuits, as disclosed in Patent Document 3. However, imbalance due to parasitic components of the circuit may generate common mode noise. In particular, since amplitudes of voltage and current increase in a resonance circuit, a large common mode noise is likely to occur upon a mismatch in the degree of balance in a power conversion apparatus including a resonance circuit. Therefore, in order to reduce common mode noise, it is required to match the degrees of balance between the primary circuit and the secondary circuit.

An object of the present disclosure is to provide a power conversion apparatus capable of reducing common mode noise than that of prior art, with simple additional components.

Solution to Problem

According to a power conversion apparatus of one aspect of the present disclosure, the power conversion apparatus is provided with a transformer, a primary circuit, and a secondary circuit. The primary circuit is connected to a primary winding of the transformer, has a primary positive bus and a primary negative bus, and includes at least one switching element. The secondary circuit is connected to a secondary winding of the transformer, has a secondary positive bus and a secondary negative bus, and includes at least one switching element. The power conversion apparatus is further provided with a coupling circuit including at least a first capacitor. The power conversion apparatus is characterized by any one of: (A) being configured such that the primary circuit is an unbalanced circuit and the secondary circuit is a balanced circuit, and having the coupling circuit connected between a center tap of the secondary winding of the transformer, and one of the primary positive bus and the primary negative bus, (B) being configured such that the primary circuit is a balanced circuit and the secondary circuit is an unbalanced circuit, and having the coupling circuit connected between a center tap of the primary winding of the transformer, and one of the secondary positive bus and the secondary negative bus, and (C) being configured such that the primary circuit is a balanced circuit and the secondary circuit is a balanced circuit, and having the coupling circuit connected between a center tap of the primary winding of the transformer, and a center tap of the secondary winding of the transformer.

Advantageous Effects of Invention

According to the power conversion apparatus of the one aspect of the present disclosure, it is possible to reduce common mode noise than that of prior art, with simple additional components.

DESCRIPTION OF EMBODIMENTS

Figure 1:
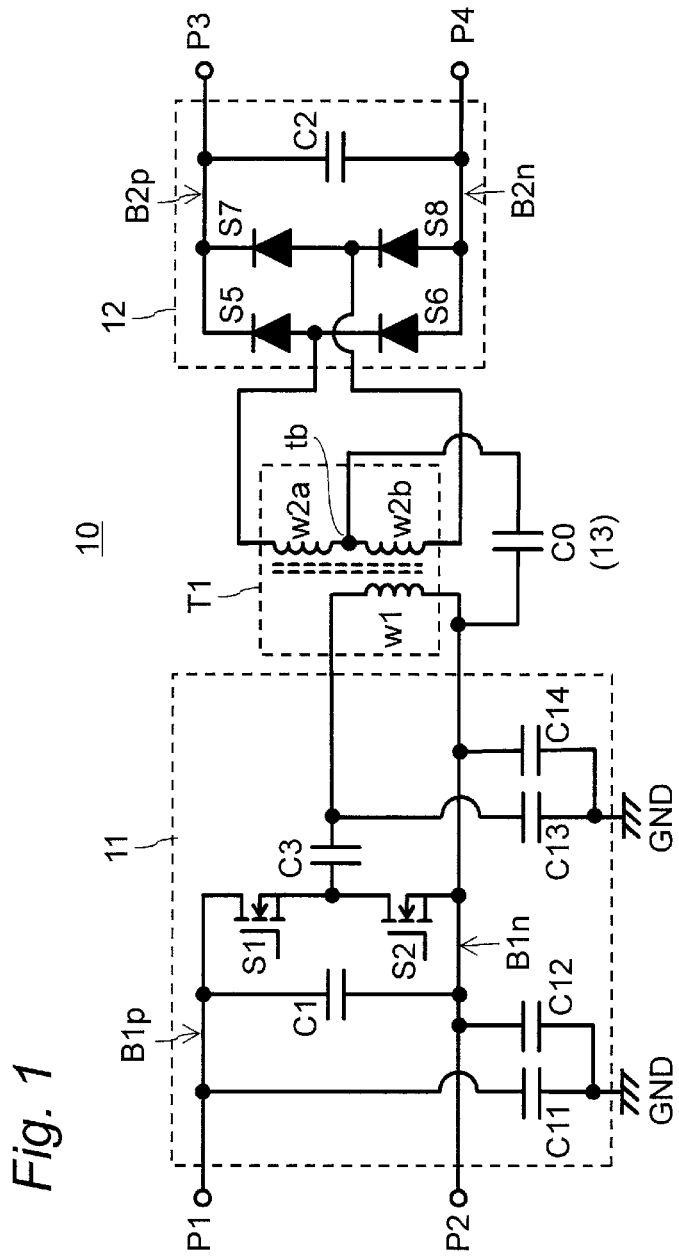
FIG. 1 is a circuit diagram illustrating a configuration of a power conversion apparatus 10 according to a first embodiment.

Hereinafter, embodiments of the present disclosure will be described with reference to the drawings. In the drawings, the same reference numerals denote similar components.

First Embodiment

FIG. 1 is a circuit diagram illustrating a configuration of a power conversion apparatus 10 according to a first embodiment. The power conversion apparatus 10 is provided with a transformer T1, a primary circuit 11, and a secondary circuit 12.

The transformer T1 has a primary winding w1, and secondary windings w2a and w2b with a center tap tb.

The primary circuit 11 of the power conversion apparatus 10 is connected to the primary winding w1 of the transformer T1. The primary circuit 11 of the power conversion apparatus 10 is provided with a primary positive bus B1p, a primary negative bus B1n, capacitors C1 and C3, and switching elements S1 and S2. A DC voltage is inputted to the positive bus B1p and the negative bus B1n from an external DC power supply apparatus through terminals P1 and P2. The capacitor C1 smooths the inputted DC voltage. The switching elements S1 and S2 are connected in series between the positive bus B1p and the negative bus B1n to constitute a half-bridge inverter. The switching elements S1 and S2 are transistors. A node between the switching elements S1 and S2 is connected to one end of the primary winding w1 of the transformer T1 through a capacitor C3. The primary winding w1 of the transformer T1, a leakage inductance of the transformer T1, and the capacitor C3 constitute an LLC resonance circuit. The LLC resonance circuit may further include a resonant inductor connected in series with the capacitor C3 and the primary winding w1 of the transformer T1.

The power conversion apparatus 10 may be provided with a ground conductor GND. In this case, the positive bus B1p and the negative bus B1n may be capacitively coupled to the ground conductor GND. This capacitance is also referred to as "Y capacitors". The example of FIG. 1 illustrates a case where the positive bus B1p and the negative bus B1n are connected to the ground conductor GND through capacitors C11 and C12, respectively.

In addition, both ends of the primary winding w1 of the transformer T1 may be capacitively coupled to the ground conductor GND. The example of FIG. 1 illustrates a case where wirings at both ends of the primary winding w1 of the transformer T1 are connected to the ground conductor GND through capacitors C13 and C14, respectively. In addition, the primary winding w1 of the transformer T1 may be capacitively coupled to the secondary windings w2a and w2b of the transformer T1.

The secondary circuit 12 of the power conversion apparatus 10 is connected to the secondary windings w2a and w2b of the transformer T1. The secondary circuit 12 of the power conversion apparatus 10 is provided with a secondary positive bus B2p, a secondary negative bus B2n, a capacitor C2, and switching elements S5 to S8. The switching elements S5 to S8 are, for example, diodes, and they constitute a full-bridge rectifier circuit. Input terminals of the rectifier circuit are connected to the secondary windings w2a and w2b of the transformer T1, and output terminals of the rectifier circuit are connected to the positive bus B2p and the negative bus B2n. The capacitor C2 smooths the voltage outputted from the rectifier circuit. The positive bus B2p and the negative bus B2n are connected to an external load apparatus through terminals P3 and P4, and the smoothed voltage is outputted to the load apparatus.

The secondary circuit 12 of the power conversion apparatus 10 may be provided with transistor switching elements, instead of the diode switching elements S5 to S8. In this case, the switching elements constitute a full-bridge synchronous rectifier circuit.

The power conversion apparatus 10 is further provided with a coupling circuit 13 including a capacitor C0. The coupling circuit 13 (i.e., capacitor C0) is connected between the center tap tb of the secondary windings of the transformer T1, and the primary negative bus B1n.

According to the first embodiment, the power conversion apparatus 10 is configured such that the primary circuit 11 is an unbalanced circuit and the secondary circuit 12 is a balanced circuit. As described above, in a case where the power conversion apparatus is provided with an unbalanced circuit and a balanced circuit, which are not matched with each other, common mode noise occurs when power is inputted from the unbalanced circuit to the balanced circuit. In the case of transmitting communication signals, it has been known that when two transmission lines having different degrees of balance are connected to each other, the transmission lines have different reference voltage potentials, and therefore, mode conversion occurs at their connection point. Therefore, by making the reference voltage potentials of the primary circuit 11 and the secondary circuit 12 the same with each other, it is possible to match the degrees of balance of the primary circuit 11 and the secondary circuit 12 with each other. According to the first embodiment, since the capacitor C0 is used, the transformer T1 serves as a balun to be used in a transmission line for communication, and therefore, it is possible to match the reference voltage potentials of the primary circuit 11 and the secondary circuit 12 with each other. The capacitor C0 is used because it is necessary for the power conversion apparatus to keep the primary circuit 11 and the secondary circuit 12 isolated from each other. As a result, it is possible to match the degrees of balance between the primary circuit 11 and the secondary circuit 12 with each other, and reduce common mode noise than that of a case without the capacitor C0 (opened).

In the case where the primary circuit 11 includes the Y capacitors (i.e., capacitors C11 and C12), the capacitance of the capacitor C0 is preferably set to be larger than the capacitance of the Y capacitors. The larger the capacitance of the capacitor C0, the greater the effect of reducing common mode noise. When the capacitance of the capacitor C0 is larger than the capacitance of the Y capacitors, common mode noise is significantly reduced. On the other hand, in the case where the secondary circuit 12 includes the Y capacitors, the effect of reducing common mode noise by the capacitor C0 is not much affected by the capacitance of the Y capacitors of the secondary circuit 12.

As described above, according to the power conversion apparatus 10 of the first embodiment, it is possible to reduce common mode noise than that of prior art, with simple additional components.

In order to reduce common mode noise using a conventional noise filter to the extent equivalent to that of the power conversion apparatus according to the embodiment of the present disclosure, a large noise filter is required. On the other hand, according to the power conversion apparatus 10 of the first embodiment, it is possible to reduce common mode noise by providing only the capacitor C0, without need of other noise reduction components. Hence, it is possible to provide a small-sized and low-cost power conversion apparatus.

According to the power conversion apparatus 10 of the first embodiment, even when the power conversion apparatus includes an LLC resonance circuit, it is possible to make large common mode noise less likely to occur.

Hereinafter, modified embodiments of the first embodiment will be described.

Figure 2:
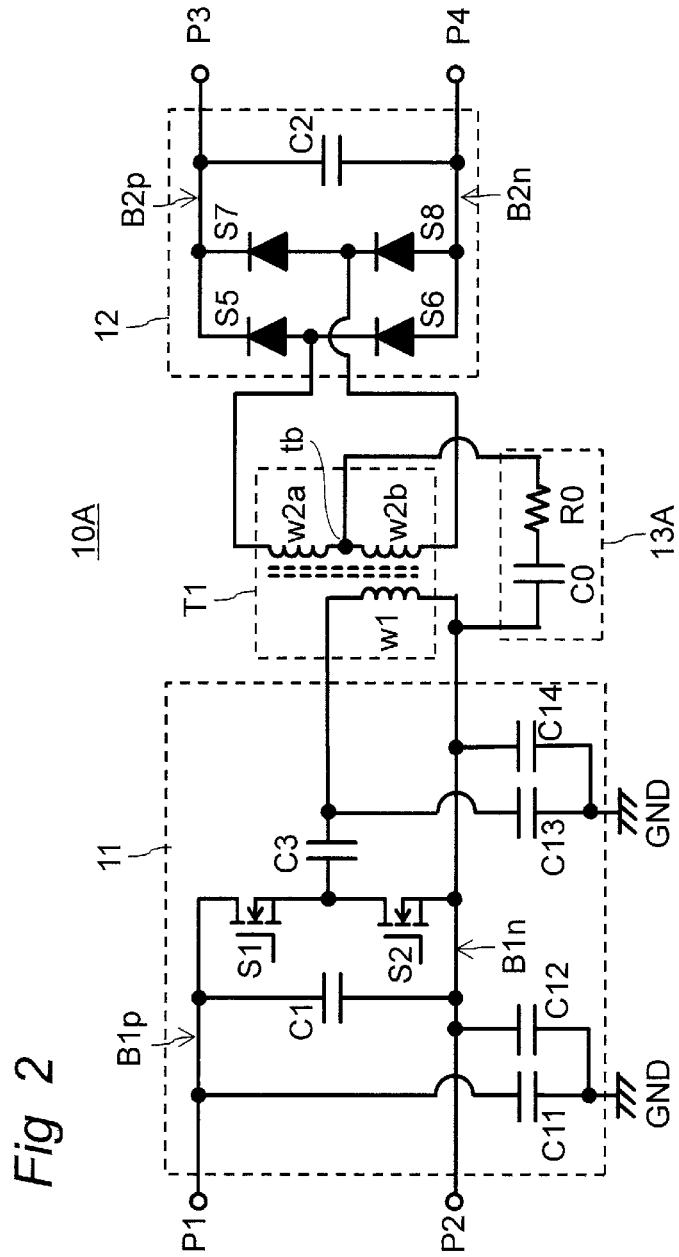
FIG. 2 is a circuit diagram illustrating a configuration of a power conversion apparatus 10A according to a first modified embodiment of the first embodiment.

FIG. 2 is a circuit diagram illustrating a configuration of a power conversion apparatus 10A according to a first modified embodiment of the first embodiment. The power conversion apparatus 10A is provided with a coupling circuit 13A including a capacitor C0 and a resistor R0 connected in series, instead of the coupling circuit 13 of the power conversion apparatus 10 of FIG. 1 (i.e., capacitor C0). A center tap tb of secondary windings of a transformer T1 is connected to a primary negative bus B1n through the capacitor C0 and the resistor R0 connected in series. Since the resistor R0 is used, even if an unwanted parasitic component occurs in the power conversion apparatus 10A, or even if there are variations in components, it is possible to make the circuit less likely to resonate. In addition, since the resistor R0 is used, it is possible to make common mode noise less likely to increase in high frequency bands. Therefore, according to the power conversion apparatus 10A of FIG. 2, it is possible to reliably reduce common mode noise over a wide frequency band.

Figure 3:
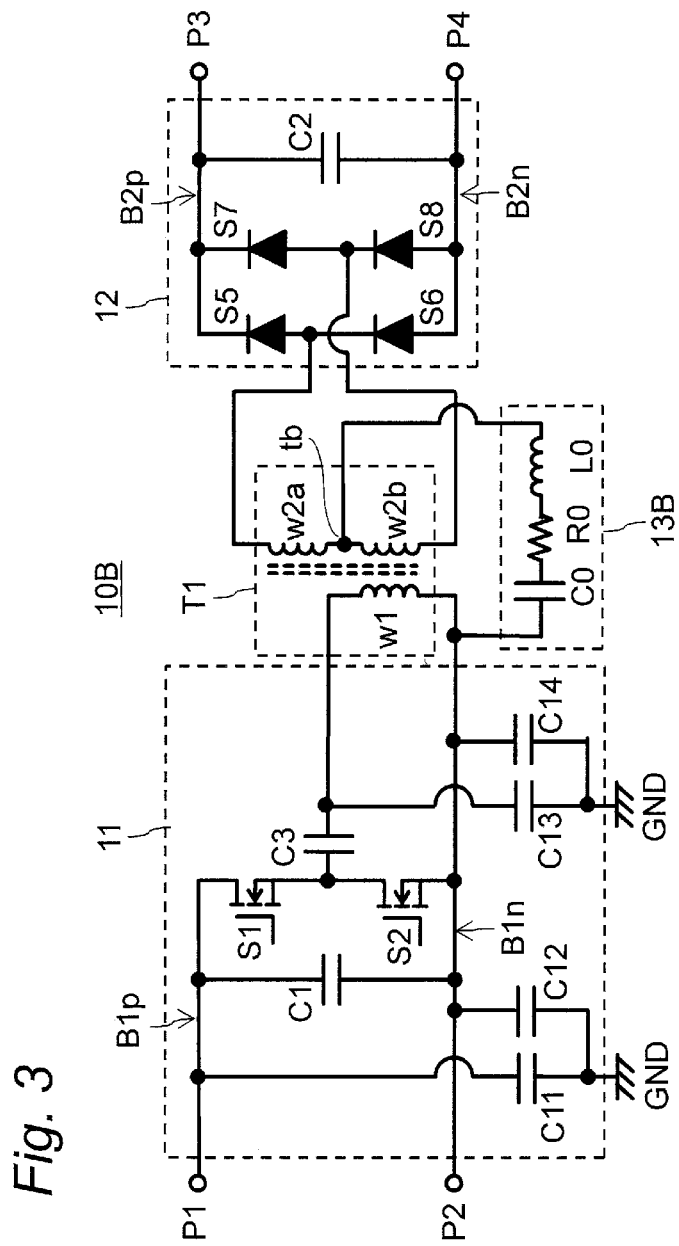
FIG. 3 is a circuit diagram illustrating a configuration of a power conversion apparatus 10B according to a second modified embodiment of the first embodiment.

FIG. 3 is a circuit diagram illustrating a configuration of a power conversion apparatus 10B according to a second modified embodiment of the first embodiment. The power conversion apparatus 10B is provided with a coupling circuit 13B including a capacitor C0, a resistor R0, and an inductor L0 connected in series, instead of the coupling circuit 13 of the power conversion apparatus 10 of FIG. 1 (i.e., capacitor C0). A center tap tb of secondary windings of a transformer T1 is connected to a primary negative bus B1n through the capacitor C0, the resistor R0, and the inductor L0 connected in series. According to the power conversion apparatus 10B of FIG. 3, it is possible to reduce common mode noise in a desired frequency band by configuring the resonance circuit of the capacitor C0, the resistor R0, and the inductor L0.

Figure 4:
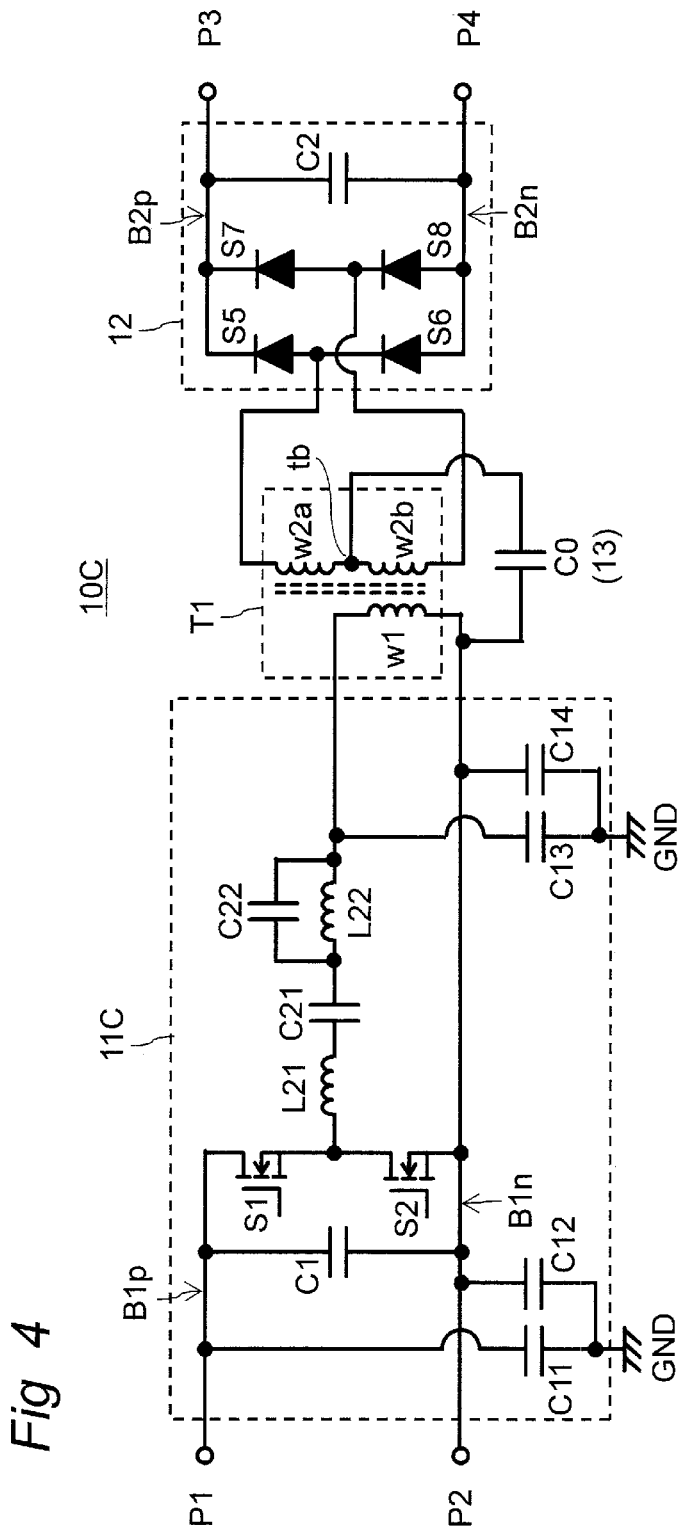
FIG. 4 is a circuit diagram illustrating a configuration of a power conversion apparatus 10C according to a third modified embodiment of the first embodiment.

FIG. 4 is a circuit diagram illustrating a configuration of a power conversion apparatus 10C according to a third modified embodiment of the first embodiment. The power conversion apparatus 10C is provided with a primary circuit 11C, instead of the primary circuit 11 of the power conversion apparatus 10 of FIG. 1. The primary circuit 11C is provided with capacitors C21 and C22 and inductors L21 and L22, instead of the capacitor C3 of FIG. 1. The inductor L21, the capacitor C21, and the inductor L22 are connected in series between a primary winding w1 of a transformer T1, and switching elements S1 and S2 of the primary circuit 11C. In addition, the capacitor C22 is connected in parallel to the inductor L22. The inductor L21 and the capacitor C21 constitute a series resonance circuit, and the inductor L22 and the capacitor C22 constitute a parallel resonance circuit. Further, the primary winding w1 of the transformer T1, the capacitors C21 and C22, and the inductors L21 and L22 constitute a resonance circuit (also referred to as "LLCLC resonance circuit"). By using such a resonance circuit for soft switching, it is possible to reduce loss and improve power density of the power conversion apparatus.

In addition, the power conversion apparatus 10C may include the coupling circuit 13A of FIG. 2 or the coupling circuit 13B of FIG. 3, instead of the coupling circuit 13 of FIG. 4.

Figure 5:
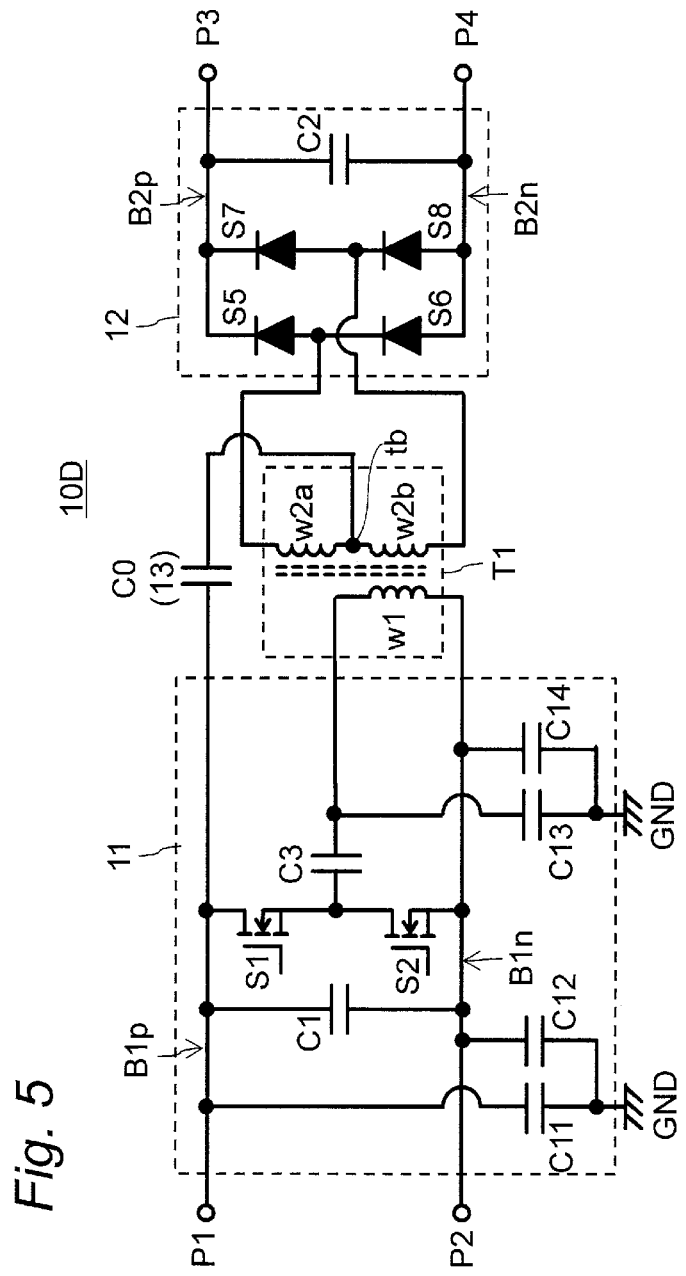
FIG. 5 is a circuit diagram illustrating a configuration of a power conversion apparatus 10D according to a fourth modified embodiment of the first embodiment.

FIG. 5 is a circuit diagram illustrating a configuration of a power conversion apparatus 10D according to a fourth modified embodiment of the first embodiment. In the power conversion apparatus according to the first embodiment, a coupling circuit 13 (i.e., capacitor C0) may be connected between a center tap tb of secondary windings of a transformer T1, and a primary positive bus B1p. Also in the case where the center tap tb is connected to the positive bus B1p, it is possible to reduce common mode noise to the extent equivalent to that of the case where the center tap tb is connected to the negative bus B1n.

In addition, the power conversion apparatus 10D may include the coupling circuit 13A of FIG. 2 or the coupling circuit 13B of FIG. 3, instead of the coupling circuit 13 of FIG. 5.

In addition, according to the first embodiment, the coupling circuit may be configured to include only the capacitor C0 and the inductor L0 connected in series.

In addition, according to the first embodiment, the primary circuit is not limited to the circuit including the two switching elements S1 and S2, and may be an unbalanced circuit including one, three, or more switching elements.

In addition, according to the first embodiment, the primary circuit may be an unbalanced circuit in which one of the positive bus B1p and the negative bus B1n is grounded.

Second Embodiment

Figure 6:
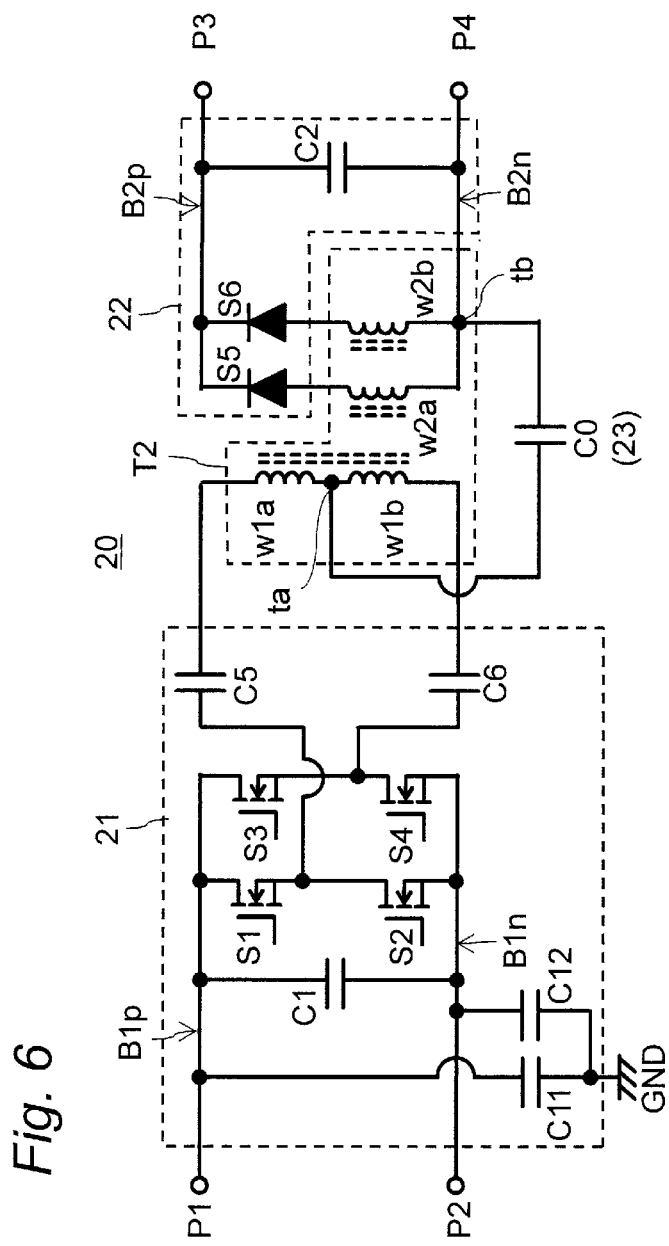
FIG. 6 is a circuit diagram illustrating a configuration of a power conversion apparatus 20 according to a second embodiment.

FIG. 6 is a circuit diagram illustrating a configuration of a power conversion apparatus 20 according to a second embodiment. The power conversion apparatus 20 is provided with a transformer T2, a primary circuit 21, and a secondary circuit 22.

The transformer T2 has primary windings w1a and w1b with a center tap ta, and has secondary windings w2a and w2b with a center tap tb.

The primary circuit 21 of the power conversion apparatus 20 is connected to the primary windings w1a and w1b of the transformer T2. The primary circuit 21 of the power conversion apparatus 20 is provided with a primary positive bus B1p, a primary negative bus B1n, capacitors C1, C5, and C6, and switching elements S1 to S4. A DC voltage is inputted to the positive bus B1p and the negative bus B1n from an external DC power supply apparatus. The capacitor C1 smooths the inputted DC voltage. The switching elements S1 to S4 are transistors, and constitute a full-bridge inverter. Input terminals of the inverter are connected to the positive bus B1p and the negative bus B1n, respectively, and output terminals of the inverter is connected to both ends of the primary windings w1a and w1b of the transformer T2 through the capacitors C5 and C6, respectively. The primary windings w1a and w1b of the transformer T2, the leakage inductance of the transformer T2, and the capacitors C5 and C6 constitute an LLC resonance circuit. The LLC resonance circuit may further include a resonant inductor connected in series with the capacitors C5, C6 and the primary windings w1a and w1b of the transformer T2.

The power conversion apparatus 20 may be provided with a ground conductor GND. In this case, the positive bus B1p and the negative bus B1n may be capacitively coupled to the ground conductor GND. This capacitance is also referred to as "Y capacitors". The example of FIG. 6 illustrates a case where the positive bus B1p and the negative bus B1n are connected to the ground conductor GND through capacitors C11 and C12, respectively.

In addition, both ends of the primary windings w1a and w1b of the transformer T2 may be capacitively coupled to the ground conductor GND. In addition, the primary windings w1a and w1b of the transformer T2 may be capacitively coupled to the secondary windings w2a and w2b of the transformer T2.

The secondary circuit 22 of the power conversion apparatus 20 is connected to the secondary windings w2a and w2b of the transformer T2. The secondary circuit 22 of the power conversion apparatus 20 is provided with a secondary positive bus B2p, a secondary negative bus B2n, a capacitor C2, and switching elements S5 and S6. The switching elements S5 and S6 are, for example, diodes, and constitute a half-bridge rectifier circuit. The anodes of the switching elements S5 and S6 are connected to both ends of the secondary windings w2a and w2b of the transformer T2, and the cathodes of the switching elements S5 and S6 are connected to the positive bus B2p. The center tap tb of the secondary windings of the transformer T2 is connected to the negative bus B2n. The capacitor C2 smooths the voltage outputted from the rectifier circuit. The positive bus B2p and the negative bus B2n are connected to an external load apparatus, and the smoothed voltage is outputted to the load apparatus.

The secondary circuit 22 of the power conversion apparatus 20 may be provided with transistor switching elements, instead of the diode switching elements S5 and S6. In this case, the switching elements constitute a half-bridge synchronous rectifier circuit.

The power conversion apparatus 20 is further provided with a coupling circuit 23 including a capacitor C0. The coupling circuit 23 is connected between the center tap to of the primary windings of the transformer T2, and the secondary negative bus B2n.

According to the second embodiment, the power conversion apparatus 20 is configured such that the primary circuit 21 is a balanced circuit and the secondary circuit 22 is an unbalanced circuit. According to the second embodiment, since the capacitor C0 is used, the transformer T2 serves as a balun, and therefore, it is possible to match the reference voltage potentials of the primary circuit 21 and the secondary circuit 22 with each other, while keeping the primary circuit 21 and the secondary circuit 22 isolated from each other, in a manner similar to that of the first embodiment. As a result, it is possible to match the degrees of balance between the primary circuit 21 and the secondary circuit 22 with each other, and reduce common mode noise than that of a case without the capacitor C0.

Also in the second embodiment, in the case where the primary circuit 21 includes the Y capacitors (i.e., capacitors C11 and C12), the capacitance of the capacitor C0 is preferably set to be larger than the capacitance of the Y capacitors, in a manner similar to that of the first embodiment. The larger the capacitance of the capacitor C0, the greater the effect of reducing common mode noise. When the capacitance of the capacitor C0 is larger than the capacitance of the Y capacitors, common mode noise is significantly reduced. On the other hand, in the case where the secondary circuit 22 includes the Y capacitors, the effect of reducing common mode noise by the capacitor C0 is not much affected by the capacitance of the Y capacitors of the secondary circuit 22.

As described above, according to the power conversion apparatus 20 of the second embodiment, it is possible to reduce common mode noise than that of prior art, with simple additional components.

According to the power conversion apparatus 20 of the second embodiment, it is possible to reduce common mode noise by providing only the capacitor C0, without need of other noise reduction components. Hence, it is possible to provide a small-sized and low-cost power conversion apparatus.

According to the power conversion apparatus 20 of the second embodiment, even when the power conversion apparatus includes an LLC resonance circuit, it is possible to make large common mode noise less likely to occur.

Hereinafter, modified embodiments of the second embodiment will be described.

Figure 7:
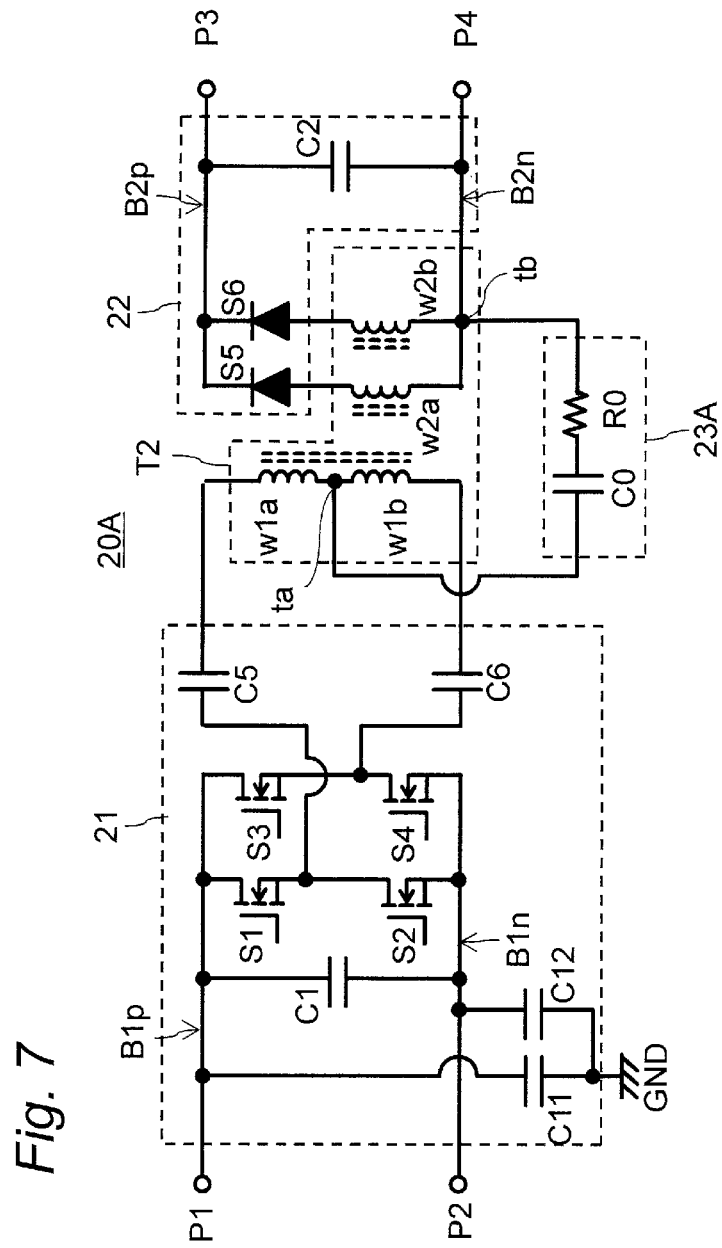
FIG. 7 is a circuit diagram illustrating a configuration of a power conversion apparatus 20A according to a first modified embodiment of the second embodiment.

FIG. 7 is a circuit diagram illustrating a configuration of a power conversion apparatus 20A according to a first modified embodiment of the second embodiment. The power conversion apparatus 20A is provided with a coupling circuit 23A including a capacitor C0 and a resistor R0 connected in series, instead of the coupling circuit 23 of the power conversion apparatus 20 of FIG. 6 (i.e., capacitor C0). A center tap ta of primary windings of a transformer T2 is connected to a secondary negative bus B2n through the capacitor C0 and the resistor R0 connected in series. Since the resistor R0 is used, even if an unwanted parasitic component occurs in the power conversion apparatus 20A, or even if there are variations in components, it is possible to make the circuit less likely to resonate. In addition, since the resistor R0 is used, it is possible to make common mode noise less likely to increase in high frequency bands. Therefore, according to the power conversion apparatus 20A of FIG. 7, it is possible to reliably reduce common mode noise over a wide frequency band.

Figure 8:
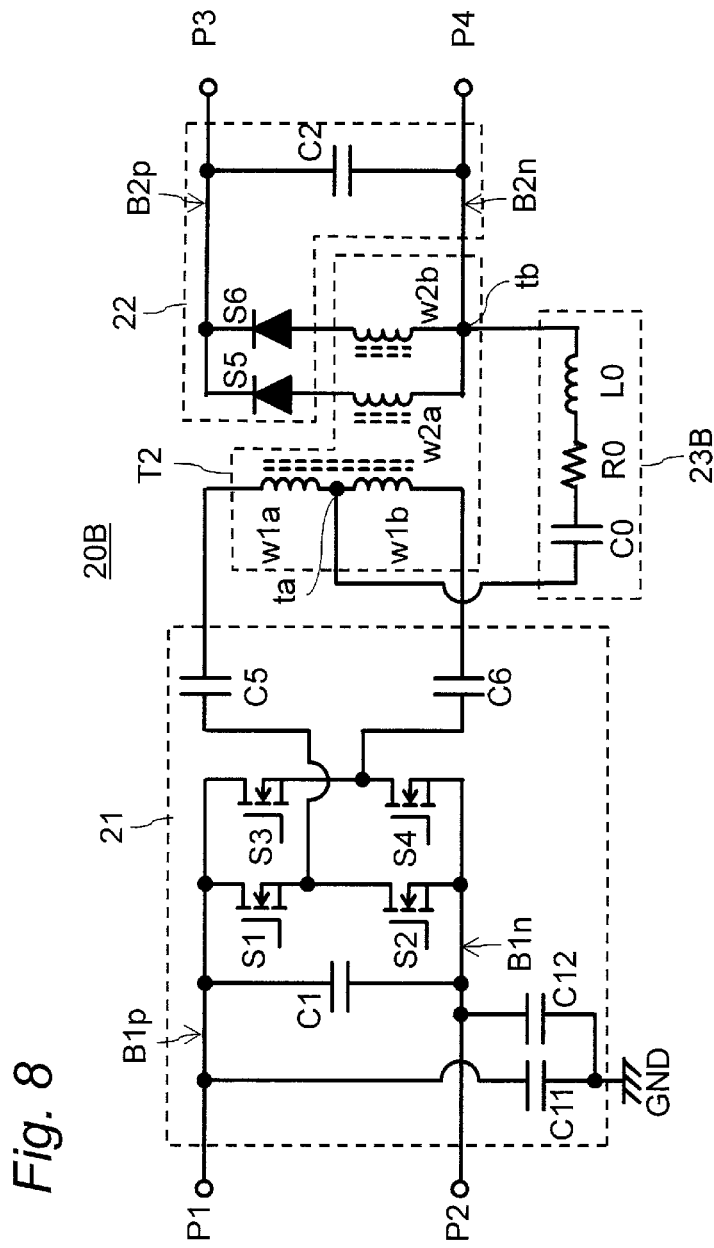
FIG. 8 is a circuit diagram illustrating a configuration of a power conversion apparatus 20B according to a second modified embodiment of the second embodiment.

FIG. 8 is a circuit diagram illustrating a configuration of a power conversion apparatus 20B according to a second modified embodiment of the second embodiment. The power conversion apparatus 20B is provided with a coupling circuit 23B including a capacitor C0, a resistor R0, and an inductor L0 connected in series, instead of the coupling circuit 23 of the power conversion apparatus 20 of FIG. 6 (i.e., capacitor C0). A center tap ta of primary windings of a transformer T2 is connected to a secondary negative bus B2n through the capacitor C0, the resistor R0, and the inductor L0 connected in series. According to the power conversion apparatus 20B of FIG. 8, it is possible to reduce common mode noise in a desired frequency band by configuring the resonance circuit of the capacitor C0, the resistor R0, and the inductor L0. In addition, according to the power conversion apparatus 20B of FIG. 8, external noise such as lightning surge is less likely to be transmitted between the primary circuit 21 and the secondary circuit 22, and therefore, the noise-resistant performance is improved.

Figure 9:
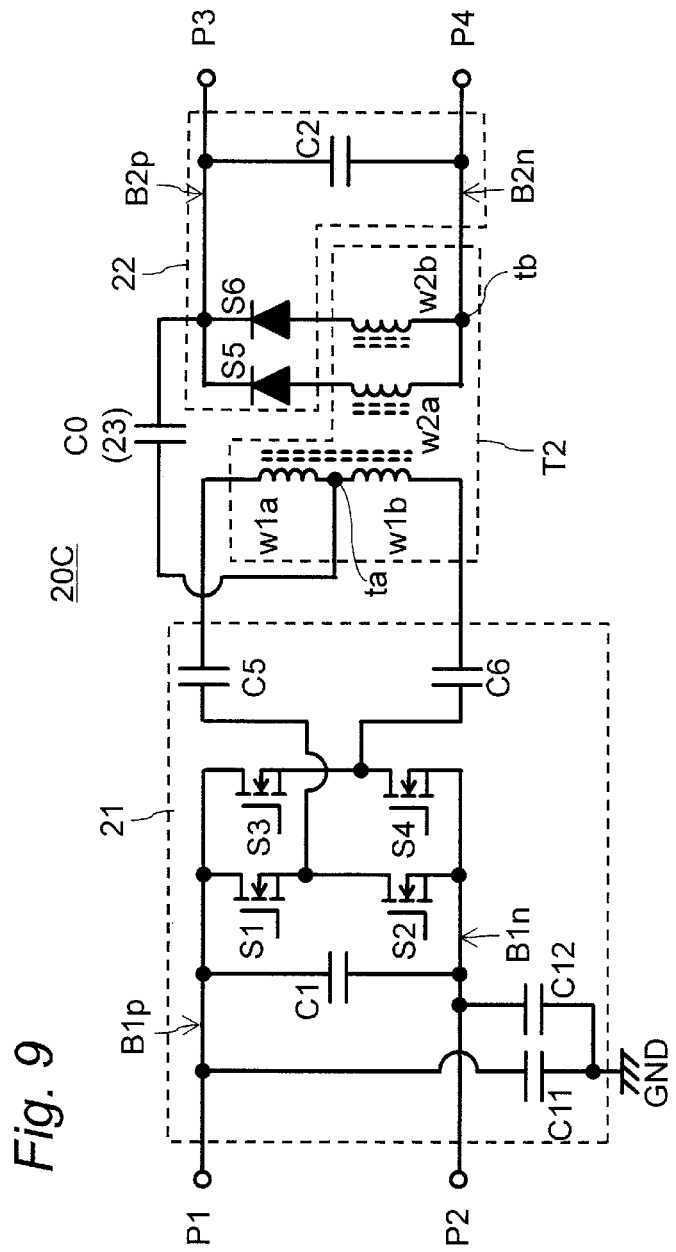
FIG. 9 is a circuit diagram illustrating a configuration of a power conversion apparatus 20C according to a third modified embodiment of the second embodiment.

FIG. 9 is a circuit diagram illustrating a configuration of a power conversion apparatus 20C according to a third modified embodiment of the second embodiment. In the power conversion apparatus according to the second embodiment, a coupling circuit 23 (i.e., capacitor C0) may be connected between a center tap ta of primary windings of a transformer T2, and a positive bus B2p. Also in the case where the center tap ta is connected to the positive bus B2p, it is possible to reduce common mode noise to the extent equivalent to the case where the center tap ta is connected to the negative bus B2n.

In addition, the power conversion apparatus 20C may be provided with the coupling circuit 23A of FIG. 7 or the coupling circuit 23B of FIG. 8, instead of the coupling circuit 23 of FIG. 9.

In addition, according to the second embodiment, the coupling circuit may be configured to include only the capacitor C0 and the inductor L0 connected in series.

In addition, according to the second embodiment, the secondary circuit is not limited to the circuit including the two switching elements S5 and S6, and may be an unbalanced circuit including one, three, or more switching elements.

In addition, according to the second embodiment, the secondary circuit may be an unbalanced circuit in which one of the positive bus B2p and the negative bus B2n is grounded.

Third Embodiment

Figure 10:
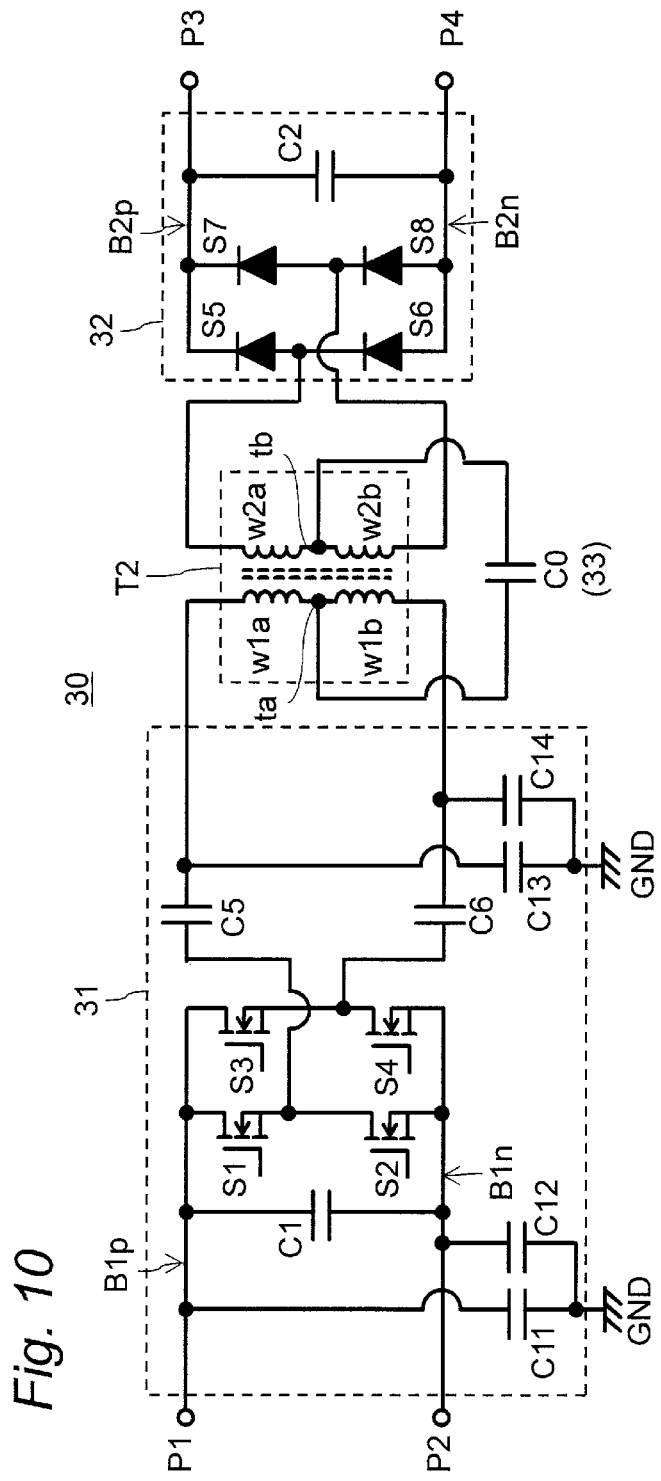
FIG. 10 is a circuit diagram illustrating a configuration of a power conversion apparatus 30 according to a third embodiment.

FIG. 10 is a circuit diagram illustrating a configuration of a power conversion apparatus 30 according to a third embodiment. The power conversion apparatus 30 is provided with a transformer T2, a primary circuit 31, and a secondary circuit 32.

The transformer T2 has primary windings w1a and w1b with a center tap ta, and has secondary windings w2a and w2b with a center tap tb.

The primary circuit 31 of the power conversion apparatus 30 is configured in a manner similar to that of the primary circuit 21 of the power conversion apparatus 20 of FIG. 6. The example of FIG. 10 illustrates a case where wirings at both ends of the primary windings w1a and w1b of the transformer T2 are connected to a ground conductor GND through capacitors C13 and C14, respectively.

The secondary circuit 32 of the power conversion apparatus 30 is configured in a manner similar to that of the secondary circuit 12 of the power conversion apparatus 10 of FIG. 1.

The power conversion apparatus 30 is further provided with a coupling circuit 33 including a capacitor C0. The coupling circuit 33 (i.e., capacitor C0) is connected between the center tap ta of the primary windings of the transformer T2, and the center tap tb of the secondary windings of the transformer T2.

According to the third embodiment, the power conversion apparatus 30 is configured such that the primary circuit 31 is a balanced circuit and the secondary circuit 32 is a balanced circuit. As described above, even when the power conversion apparatus is provided with the balanced primary circuit 31 and the balanced secondary circuit 32, imbalance due to parasitic components of the circuits may generate common mode noise. For example, in a case where the capacitances of the capacitors C13 and C14 are different from each other, the balance is broken. It is assumed that the capacitors C13 and C14 are parasitic capacitances occurring between the transformer T2 and the heat sink (GND). It can be said that the balance is broken in many transformers unless their physical structure is perfectly symmetrical. According to the third embodiment, since the capacitor C0 is used, the transformer T2 serves as a balun, and therefore, it is possible to match the reference voltage potentials of the primary circuit 31 and the secondary circuit 32 with each other, while keeping the primary circuit 31 and the secondary circuit 32 isolated from each other, in a manner similar to that of the first and second embodiments. As a result, it is possible to match the degrees of balance between the primary circuit 31 and the secondary circuit 32 with each other, and reduce common mode noise than that of a case without the capacitor C0.

Also in the third embodiment, in the case where the primary circuit 31 includes the Y capacitors (i.e., capacitors C11 and C12), the capacitance of the capacitor C0 is preferably set to be larger than the capacitance of the Y capacitors, in a manner similar to that of the first embodiment. The larger the capacitance of the capacitor C0, the greater the effect of reducing common mode noise. When the capacitance of the capacitor C0 is larger than the capacitance of the Y capacitors, common mode noise is significantly reduced. On the other hand, in the case where the secondary circuit 32 includes the Y capacitors, the effect of reducing the common mode noise by the capacitor C0 is not much affected by the capacitance of the Y capacitors of the secondary circuit 32.

As described above, according to the power conversion apparatus 30 of the third embodiment, it is possible to reduce common mode noise than that of prior art, with simple additional components.

According to the power conversion apparatus 30 of the third embodiment, it is possible to reduce common mode noise by providing only the capacitor C0, without need of other noise reduction components. Hence, it is possible to provide a small-sized and low-cost power conversion apparatus.

According to the power conversion apparatus 30 of the third embodiment, even when the power conversion apparatus includes an LLC resonance circuit, it is possible to make large common mode noise less likely to occur.

Hereinafter, modified embodiments of the third embodiment will be described.

Figure 11:
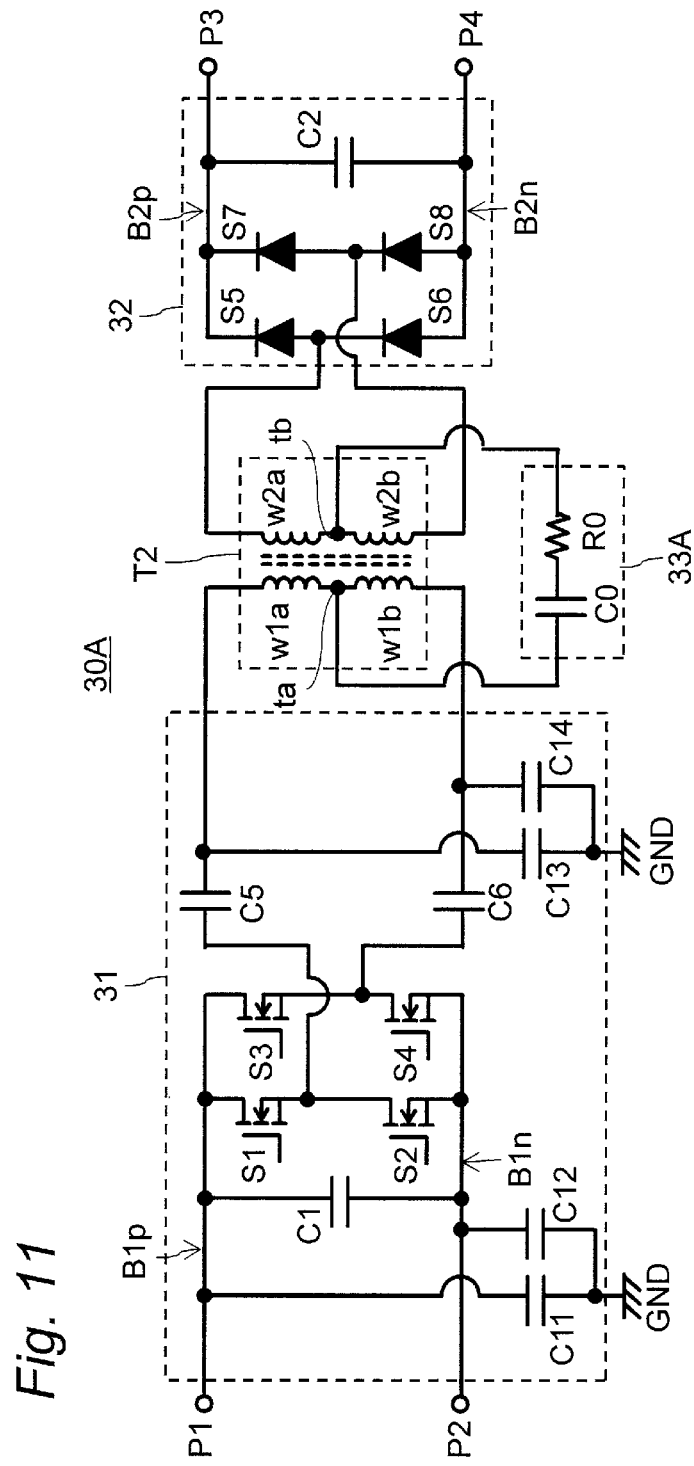
FIG. 11 is a circuit diagram illustrating a configuration of a power conversion apparatus 30A according to a first modified embodiment of the third embodiment.

FIG. 11 is a circuit diagram illustrating a configuration of a power conversion apparatus 30A according to a first modified embodiment of the third embodiment. The power conversion apparatus 30A is provided with a coupling circuit 33A including a capacitor C0 and a resistor R0 connected in series, instead of the coupling circuit 33 of the power conversion apparatus 30 of FIG. 10 (i.e., capacitor C0). A center tap ta of primary windings of a transformer T2 is connected to a center tap tb of secondary windings of the transformer T2 through the capacitor C0 and the resistor R0 connected in series. Since the resistor R0 is used, even if an unwanted parasitic component occurs in the power conversion apparatus 30A, or even if there are variations in components, it is possible to make the circuit less likely to resonate. In addition, since the resistor R0 is used, it is possible to make common mode noise less likely to increase in high frequency bands. Therefore, according to the power conversion apparatus 30A of FIG. 11, it is possible to reliably reduce common mode noise over a wide frequency band.

Figure 12:
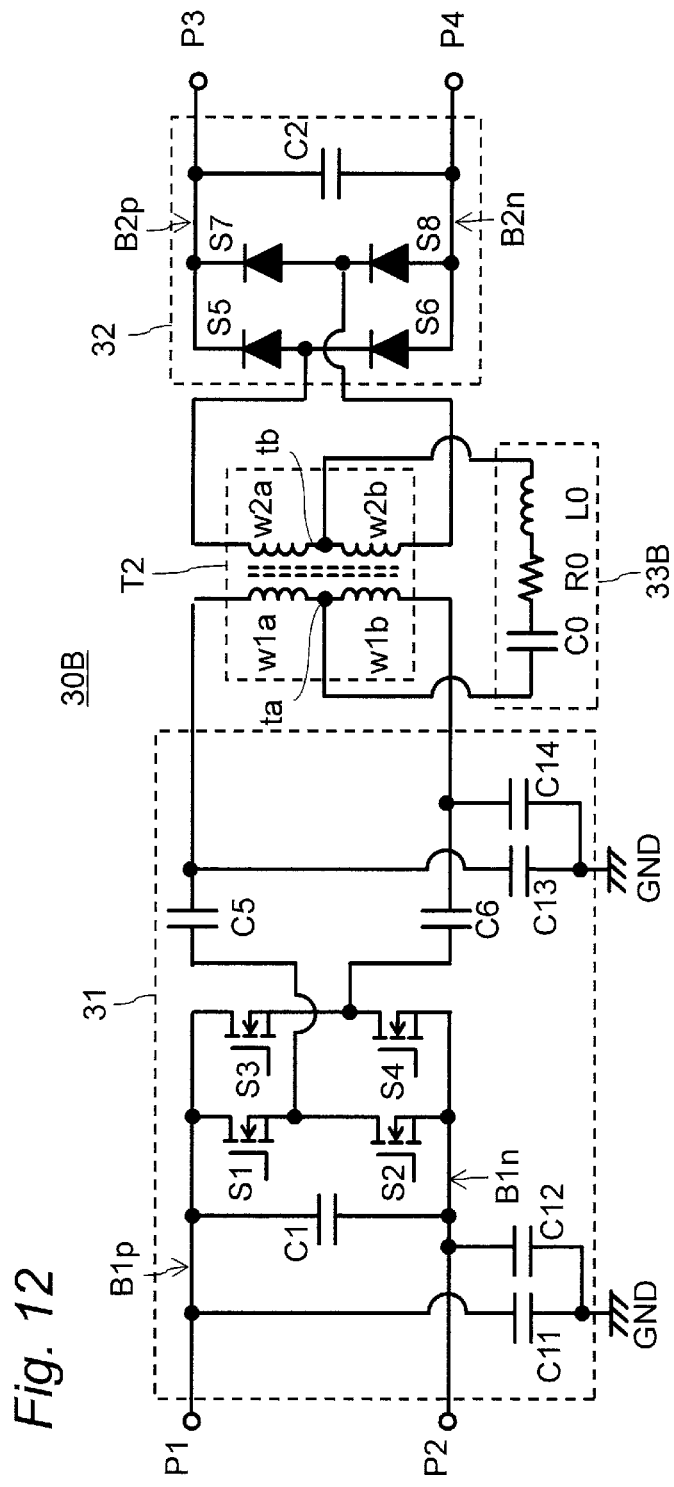
FIG. 12 is a circuit diagram illustrating a configuration of a power conversion apparatus 30B according to a second modified embodiment of the third embodiment.

FIG. 12 is a circuit diagram illustrating a configuration of a power conversion apparatus 30B according to a second modified embodiment of the third embodiment. The power conversion apparatus 30B is provided with a coupling circuit 33B including a capacitor C0, a resistor R0, and an inductor L0 connected in series, instead of the coupling circuit 33 of the power conversion apparatus 30 of FIG. 10 (i.e., capacitor C0). A center tap ta of primary windings of a transformer T2 is connected to a center tap tb of secondary windings of the transformer T2 through the capacitor C0, the resistor R0, and the inductor L0 connected in series. According to the power conversion apparatus 30B of FIG. 12, it is possible to reduce common mode noise in a desired frequency band by configuring the resonance circuit of the capacitor C0, the resistor R0, and the inductor L0.

Figure 13:
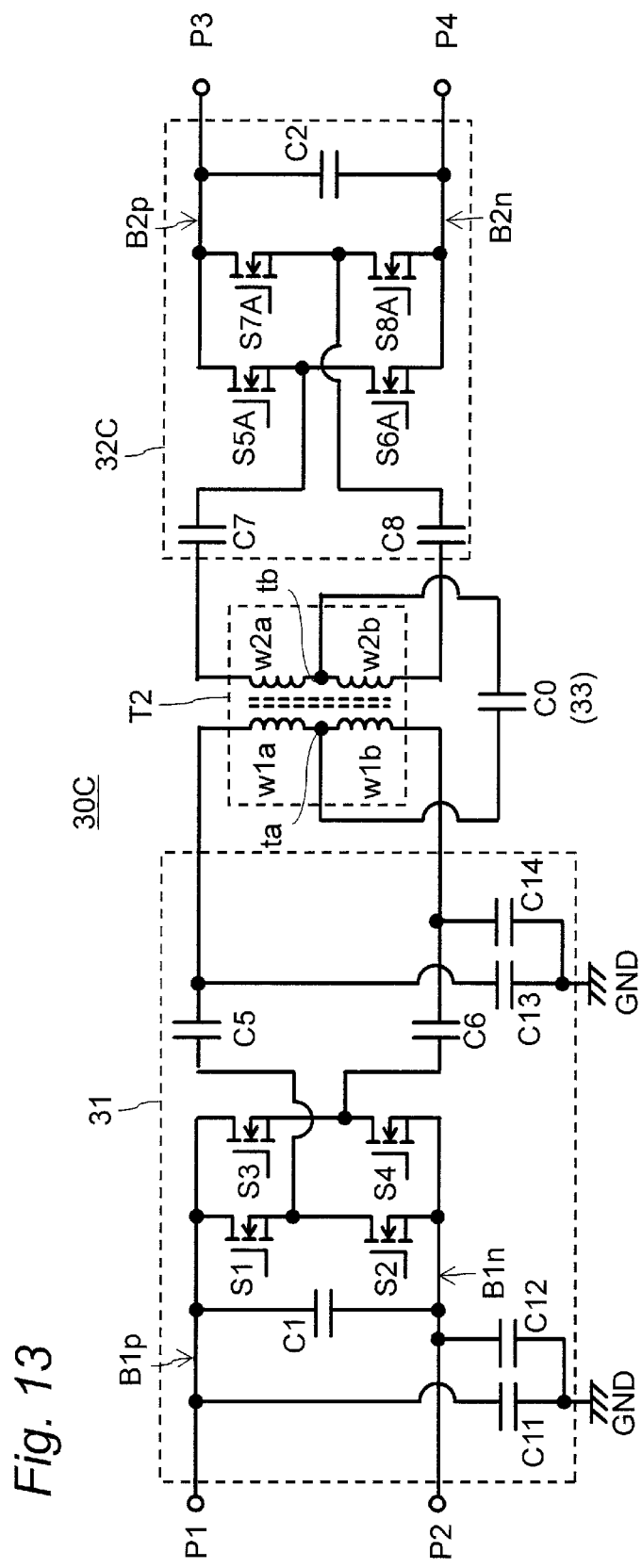
FIG. 13 is a circuit diagram illustrating a configuration of a power conversion apparatus 30C according to a third modified embodiment of the third embodiment.

FIG. 13 is a circuit diagram illustrating a configuration of a power conversion apparatus 30C according to a third modified embodiment of the third embodiment. The power conversion apparatus 30C is provided with a secondary circuit 32C, instead of the secondary circuit 32 of the power conversion apparatus 30 of FIG. 10. The secondary circuit 32C is provided with transistor switching elements S5A to S8A, instead of the diode switching elements S5 to S8 of FIG. 10. The secondary circuit 32C is further provided with capacitors C7 and C8 connected between both ends of secondary windings w2a and w2b of the transformer T2, and the switching elements S5A to S8A of the secondary circuit, respectively. Switching elements S1 to S4 of a primary circuit 31 operate as an inverter, and also operate as a synchronous rectifier circuit. The switching elements S5A to S8A of the secondary circuit 32C operate as an inverter, and also operate as a synchronous rectifier circuit. As a result, the power conversion apparatus 30C operates as a "reversible" power conversion apparatus configured to convert a voltage inputted from the primary side into a predetermined voltage and output the voltage from the secondary side, and also configured to convert a voltage inputted from the secondary side into a predetermined voltage and output the voltage from the primary side. Capacitors C5 and C6, the primary windings w1a and w1b and the secondary windings w2a and w2b of the transformer T2, and the capacitors C7 and C8 constitute a resonance circuit (also referred to as "CLLC resonance circuit"). By using such a resonance circuit for soft switching, it is possible to reduce loss and improve power density of the power conversion apparatus.

Implementation Examples

Hereinafter, simulation results of power conversion apparatuses according to implementation examples of the present disclosure will be described with reference to FIGS. 14 to 28.

Figure 14:
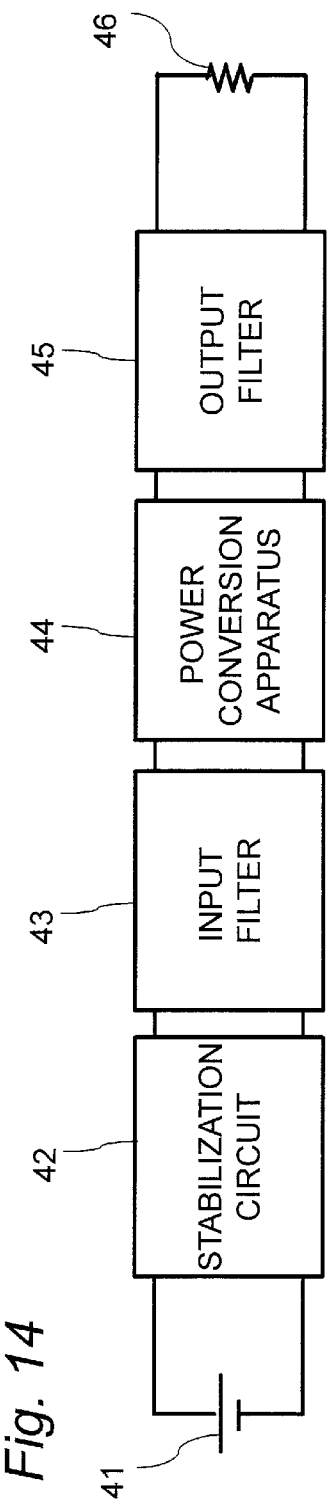
FIG. 14 is a block diagram illustrating a configuration of a power unit according to an implementation example.

FIG. 14 is a block diagram illustrating a configuration of a power unit according to the implementation example. The power unit is provided with a DC power supply apparatus 41, a stabilization circuit 42, an input filter 43, a power conversion apparatus 44, an output filter 45, and a load apparatus 46.

The DC power supply apparatus 41 supplies a predetermined DC voltage.

Figure 15:
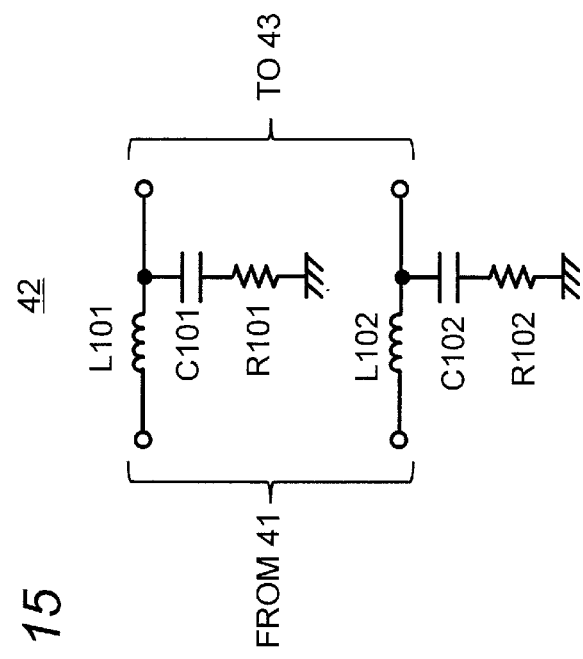
FIG. 15 is a circuit diagram illustrating a configuration of a stabilization circuit 42 of FIG. 14.

FIG. 15 is a circuit diagram illustrating a configuration of the stabilization circuit 42 of FIG. 14. The stabilization circuit 42 is provided with capacitors C101 and C102, inductors L101 and L102, and resistors R101 and R102. The stabilization circuit 42 stabilizes impedance at terminals through which power is inputted to the power conversion apparatus 44, in order to accurately measure common mode noise generated by the power conversion apparatus 44. In the simulations described below, we calculated common mode noise in the stabilization circuit 42.

Figure 16:
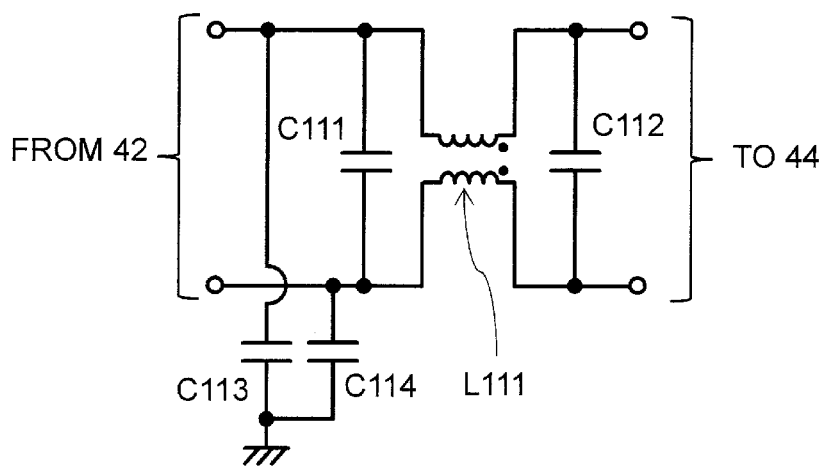
FIG. 16 is a circuit diagram illustrating a configuration of an input filter 43 of FIG. 14.

FIG. 16 is a circuit diagram illustrating a configuration of the input filter 43 of FIG. 14. The input filter 43 is provided with capacitors C111 to C114 and a common mode choke coil L111.

The power conversion apparatus 44 is any of the power conversion apparatuses described in the first to third embodiments.

Figure 17:
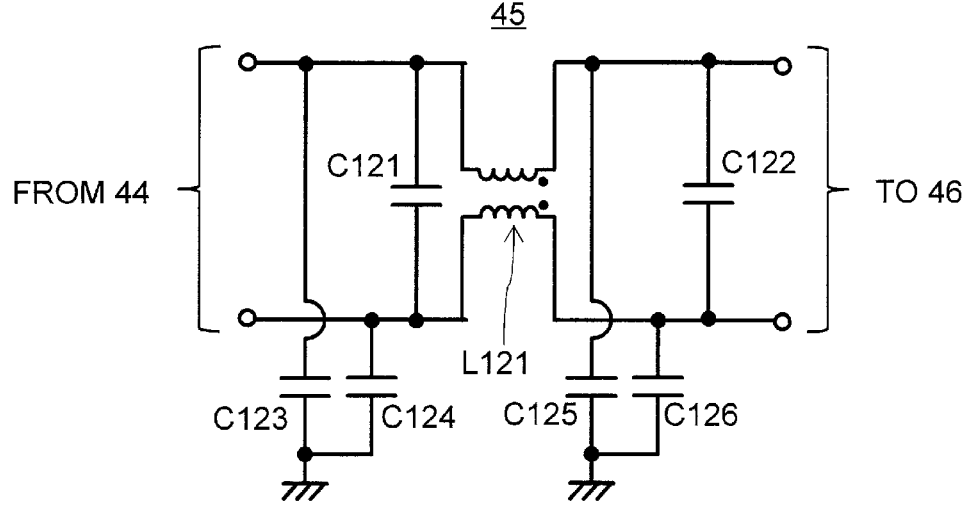
FIG. 17 is a circuit diagram illustrating a configuration of an output filter 45 of FIG. 14.

FIG. 17 is a circuit diagram illustrating a configuration of the output filter 45 of FIG. 14. The output filter 45 is provided with capacitors C121 to C126 and a common mode choke coil L121.

The load apparatus 46 has a predetermined resistance.

Next, simulation results of the power conversion apparatuses according to the first embodiment will be described with reference to FIGS. 18 to 21. Here, we conducted simulations for a case where the power conversion apparatus 44 is the power conversion apparatus 10 of FIG. 1, the power conversion apparatus 10A of FIG. 2, or the power conversion apparatus 10B of FIG. 3.

For the simulations of FIGS. 18 to 21, the following parameters were set.
(DC Power Supply Apparatus 41)
  Input voltage: 400 V
(Input Filter 43)
  Capacitance of capacitors C111 and C112: 2 µF
  Capacitance of capacitors C113 and C114: 1 nF
  Inductance of common mode choke coil L111: 3 mH
  Coupling coefficient of common mode choke coil L111: 0.9995
(Power Conversion Apparatus 44)
  Capacitance of capacitor C1: 100 µF
  Capacitance of capacitor C2: 10 µF
  Capacitance of capacitor C3: 22.5 nF
  Capacitance of capacitors C11 and C12: 1 nF
  Capacitance of capacitors C13 and C14: 10 pF
  Inductance of primary winding w1 of transformer T1: 120 µH
  Inductance of secondary windings w2a and w2b of transformer T1: 6.6 µH
  Coupling coefficient of transformer T1: 0.94
  Switching frequency of switching elements S1 and S2: 200 kHz
(Output filter 45)
  Capacitance of capacitors C121 and C122: 2 µF
  Capacitance of capacitors C123 to C126: 10 nF
  Inductance of common mode choke coil L121: 3 mH
  Coupling coefficient of common mode choke coil L121: 0.9995
(Load apparatus 46)
  Resistance of load apparatus 46: 10 Ω

Figure 18:
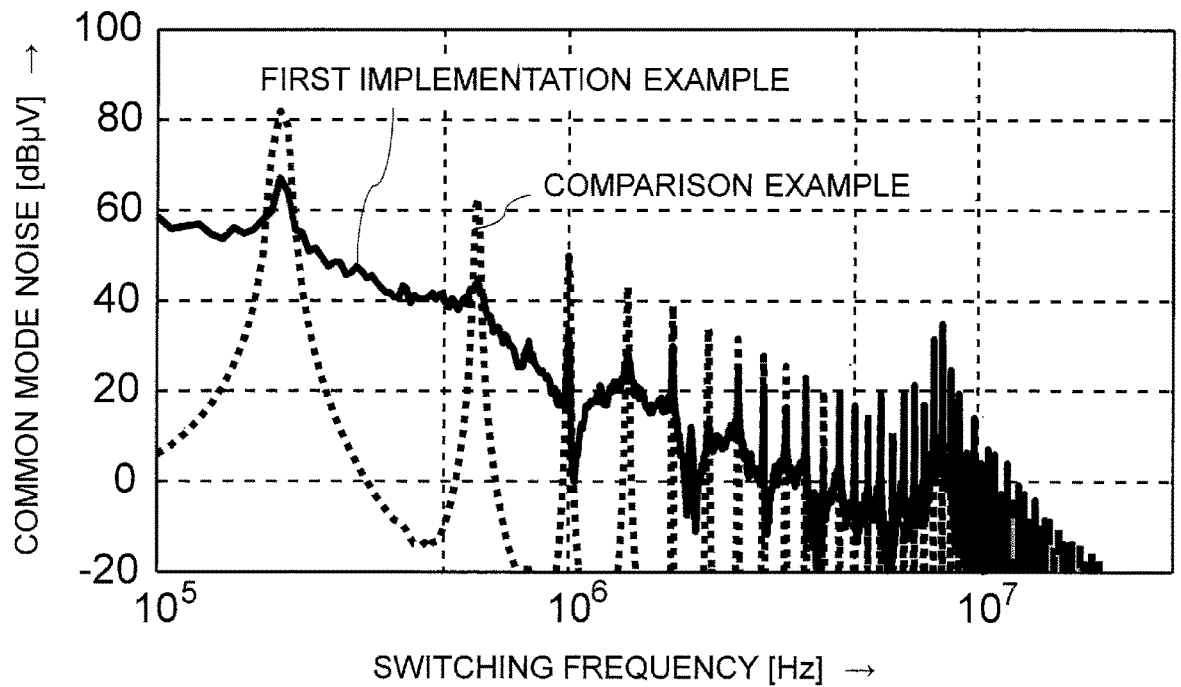
FIG. 18 is a graph illustrating frequency characteristics of common mode noise occurring in a power unit including a power conversion apparatus according to a first implementation example.

FIG. 18 is a graph illustrating frequency characteristics of common mode noise occurring in the power unit including the power conversion apparatus according to the first implementation example. Referring to FIG. 18, the first implementation example illustrates a case where a power conversion apparatus 44 is the power conversion apparatus 10 of FIG. 1, and the capacitance of a capacitor C0 is set to 100 nF. In addition, referring to FIG. 18, a comparison example illustrates a case where the capacitor C0 is removed. According to FIG. 18, the frequency characteristics of common mode noise are observed as a spectrum with peaks at integral multiples of the switching frequency. In addition, according to FIG. 18, it can be seen that common mode noise can be reduced by 14.7 dB at the switching frequency of 200 kHz.

In addition, according to FIG. 18, it can be seen that harmonic common mode noise up to about 5 MHz can also be reduced.

Figure 19:
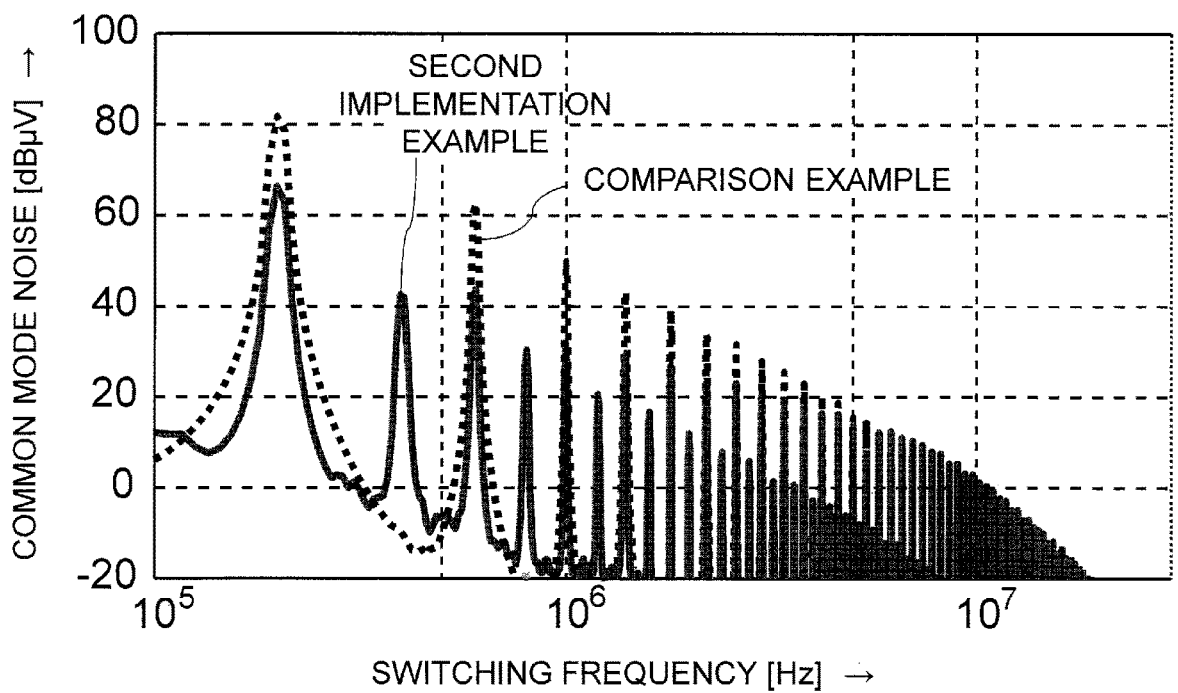
FIG. 19 is a graph illustrating frequency characteristics of common mode noise occurring in a power unit including a power conversion apparatus according to a second implementation example.

FIG. 19 is a graph illustrating frequency characteristics of common mode noise occurring in a power unit including a power conversion apparatus according to a second implementation example. Referring to FIG. 19, the second implementation example illustrates a case where a power conversion apparatus 44 is the power conversion apparatus 10A of FIG. 2, the capacitance of a capacitor C0 is set to 100 nF, and the resistance of a resistor R0 is set to 10Ω. In addition, referring to FIG. 19, a comparison example illustrates a case where the capacitor C0 and the resistor R0 are removed. According to FIG. 19, it can be seen that common mode noise can be reduced by 15.4 dB at the switching frequency of 200 kHz. In addition, according to FIG. 19, it can be seen that unwanted resonance at high frequencies is damped, and the common mode noise characteristics at high frequencies are improved as compared with the case of FIG. 18.

Figure 20:
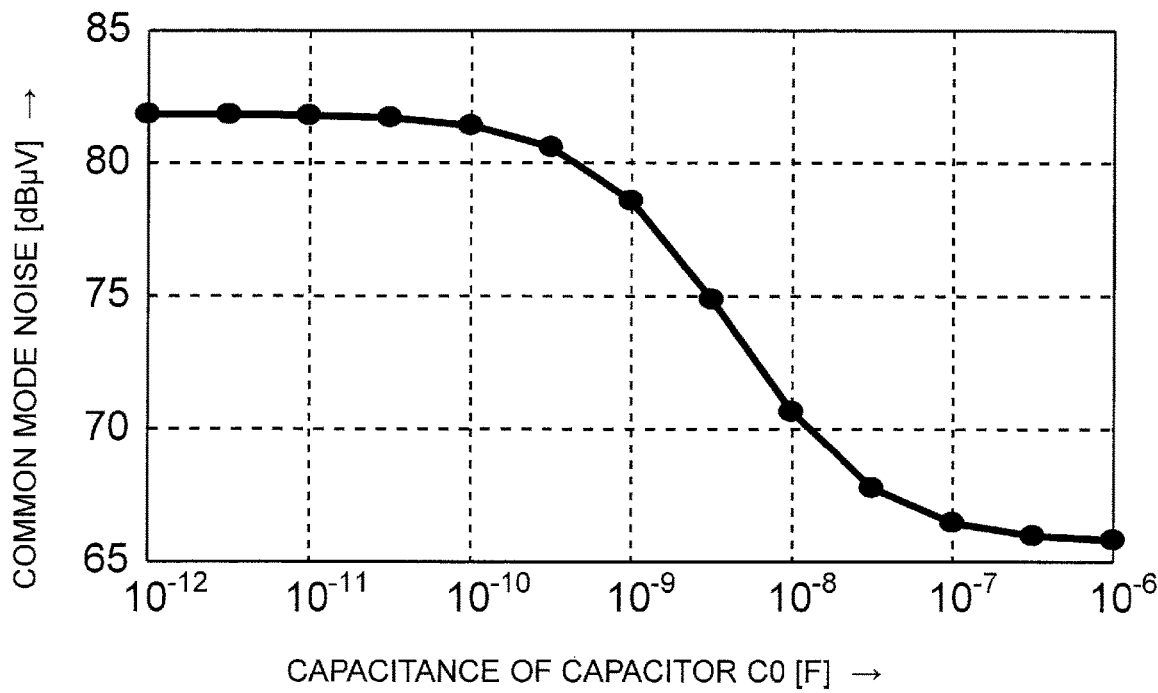
FIG. 20 is a graph illustrating the characteristics of common mode noise occurring in the power unit including the power conversion apparatus according to the second implementation example, with respect to the capacitance of a capacitor C0 of the power unit.

FIG. 20 is a graph illustrating the characteristics of common mode noise occurring in the power unit including the power conversion apparatus according to the second implementation example, with respect to the capacitance of the capacitor C0 of the power unit. FIG. 20 illustrates a case where the power conversion apparatus 44 is the power conversion apparatus 10A of FIG. 2, the capacitance of the capacitor C0 is changed over 1 pF to 1 µF, and the resistance of the resistor R0 is set to 10Ω. According to FIG. 20, it can be seen that when the capacitance of the capacitor C0 exceeds the capacitances of the capacitors C11 and C12 (Y capacitors), the effect of reducing common mode noise increases.

Figure 21:
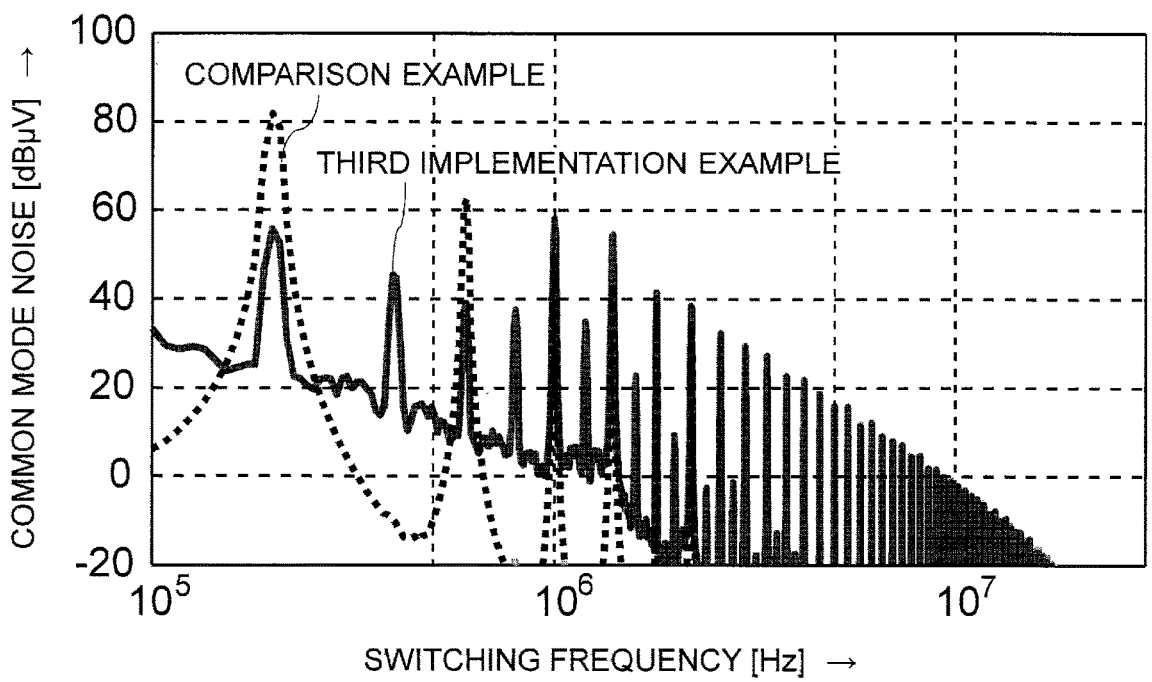
FIG. 21 is a graph illustrating frequency characteristics of common mode noise occurring in a power unit including a power conversion apparatus according to a third implementation example.

FIG. 21 is a graph illustrating frequency characteristics of common mode noise occurring in a power unit including a power conversion apparatus according to a third implementation example. Referring to FIG. 21, the third implementation example illustrates a case where a power conversion apparatus 44 is the power conversion apparatus 10B of FIG. 3, the capacitance of a capacitor C0 is set to 100 nF, the resistance of a resistor R0 is set to 10Ω, and the inductance of an inductor L0 is set to 9.4 µH. In addition, referring to FIG. 21, a comparison example illustrates a case where the capacitor C0, the resistor R0, and the inductor L0 are removed. According to FIG. 21, it can be seen that common mode noise can be reduced by 26.1 dB at the switching frequency of 200 kHz. In addition, according to FIG. 21, it can be seen that although common mode noise can be effectively reduced only in limited frequency bands, it can be more effectively reduced in a specific frequency band.

Next, simulation results of the power conversion apparatuses according to the second embodiment will be described with reference to FIGS. 22 to 24. Here, we conducted simulations for a case where the power conversion apparatus 44 is the power conversion apparatus 20 of FIG. 6 or the power conversion apparatus 20A of FIG. 7.

Figure 22:
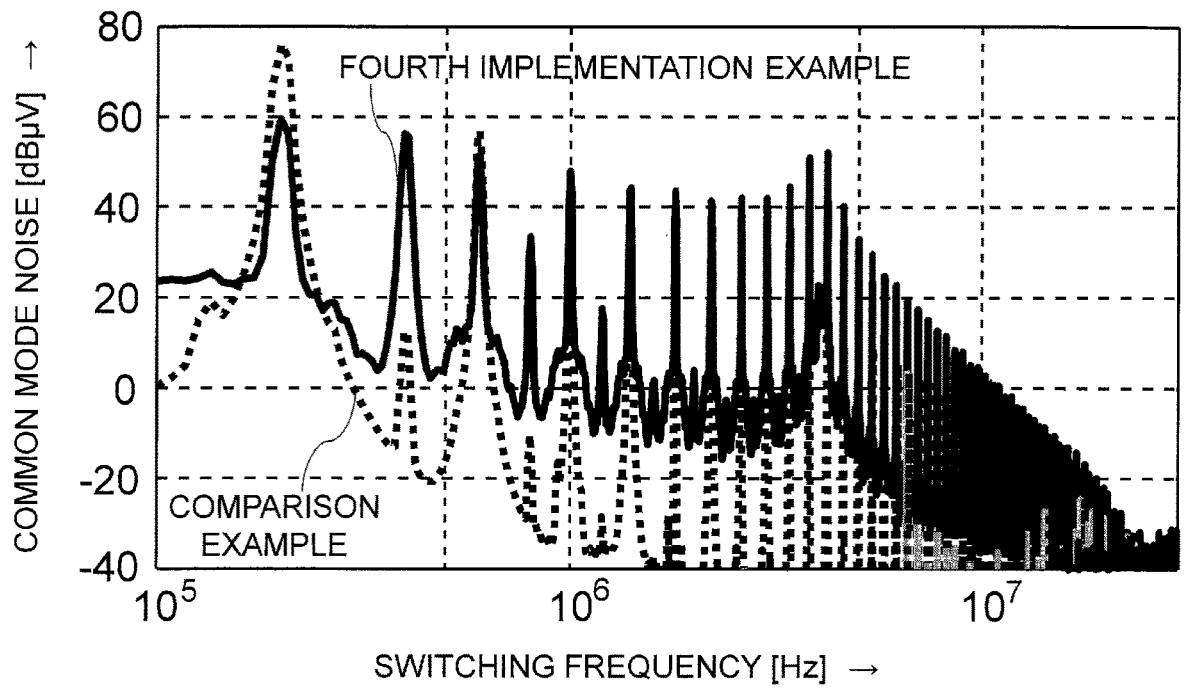
FIG. 22 is a graph illustrating frequency characteristics of common mode noise occurring in a power unit including a power conversion apparatus according to a fourth implementation example.
Figure 23:
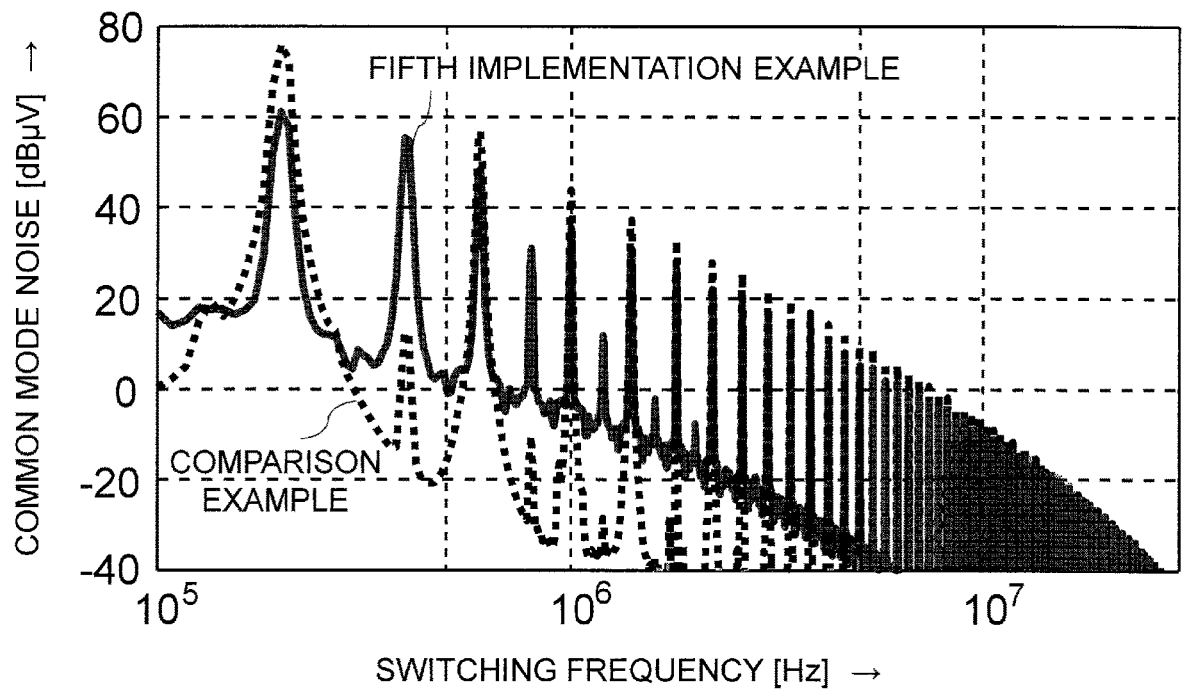
FIG. 23 is a graph illustrating frequency characteristics of common mode noise occurring in a power unit including a power conversion apparatus according to a fifth implementation example.
Figure 24:
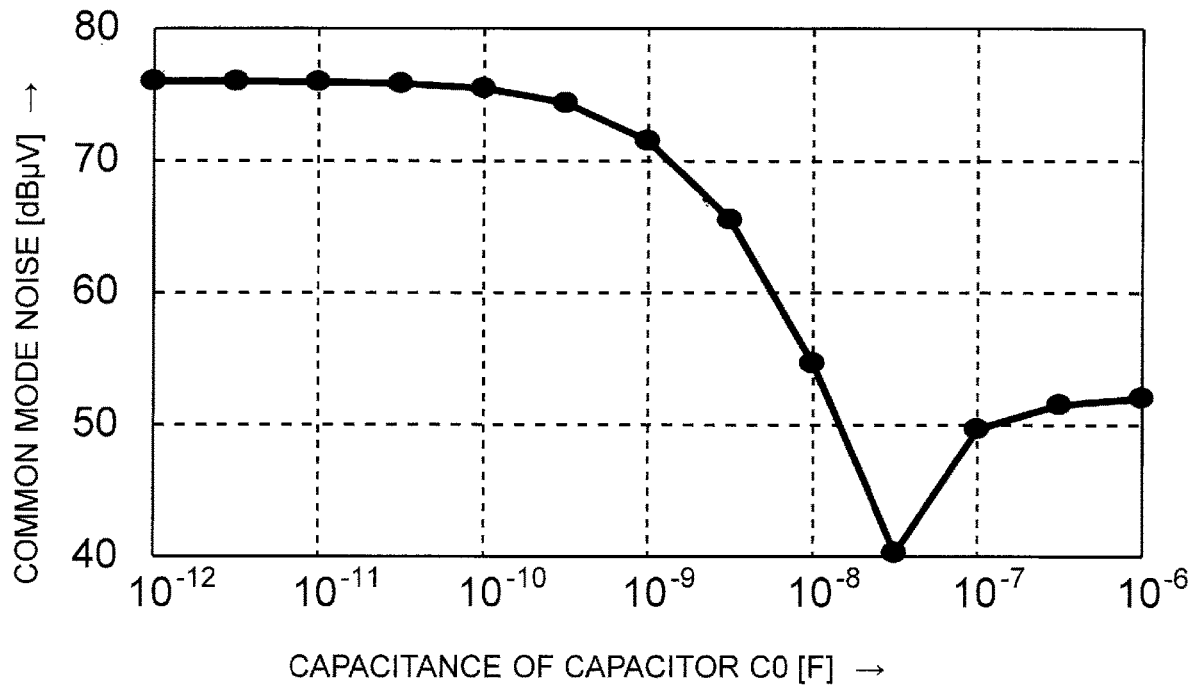
FIG. 24 is a graph illustrating the characteristics of common mode noise occurring in the power unit including the power conversion apparatus according to the fifth implementation example, with respect to the capacitance of a capacitor C0 of the power unit.

For the simulations of FIGS. 22 to 24, the following parameters were set.
(DC power supply apparatus 41)
  Input voltage: 200 V
(Power conversion apparatus 44)
  Capacitance of capacitor C1: 100 µF
  Capacitance of capacitor C2: 10 µF
  Capacitance of capacitors C5 and C6: 45 nF
  Capacitance of capacitors C11 and C12: 1 nF
  Inductance of primary windings w1a and w1b of transformer T2: 30 µH Inductance of secondary windings w2a and w2b of transformer T2: 26.4 μH
Coupling coefficient of transformer T2: 0.94
Switching frequency of switching elements S1 and S2: 200 kHz For the simulations of FIGS. 22 to 24, a capacitance of 10 pF was further set between a terminal of a primary winding w1b of a transformer T2 (i.e., node between primary winding w1b and capacitor C6) and a center tap tb of secondary windings of the transformer T2.

For the simulations of FIGS. 22 to 24, the same parameters of an input filter 43, an output filter 45, and a load apparatus 46 were set as those of the cases of FIGS. 18 to 21.

FIG. 22 is a graph illustrating frequency characteristics of common mode noise occurring in a power unit including a power conversion apparatus according to a fourth implementation example. Referring to FIG. 22, the fourth implementation example illustrates a case where a power conversion apparatus 44 is the power conversion apparatus 20 of FIG. 6, and the capacitance of a capacitor C0 is set to 30 nF. In addition, referring to FIG. 22, a comparison example illustrates a case where the capacitor C0 is removed. According to FIG. 22, it can be seen that common mode noise can be reduced by 16.5 dB at the switching frequency of 200 kHz.

FIG. 23 is a graph illustrating frequency characteristics of common mode noise occurring in a power unit including a power conversion apparatus according to a fifth implementation example. Referring to FIG. 23, the fifth implementation example illustrates a case where a power conversion apparatus 44 is the power conversion apparatus 20A of FIG. 7, the capacitance of a capacitor C0 is set to 30 nF, and the resistance of a resistor R0 is set to 100 CZ. In addition, referring to FIG. 23, a comparison example illustrates a case where the capacitor C0 and the resistor R0 are removed. According to FIG. 23, it can be seen that common mode noise can be reduced by 14.8 dB at the switching frequency of 200 kHz. In addition, according to FIG. 23, it can be seen that unwanted resonance at high frequencies is damped, and the common mode noise characteristics at high frequencies are improved as compared with the case of FIG. 22.

FIG. 24 is a graph illustrating the characteristics of common mode noise occurring in the power unit including the power conversion apparatus according to the fifth implementation example, with respect to the capacitance of the capacitor C0 of the power unit. FIG. 24 illustrates a case where the power conversion apparatus 44 is the power conversion apparatus 20A of FIG. 7, the capacitance of the capacitor C0 is changed over 1 pF to 1 μF, and the resistance of the resistor R0 is set to 10Ω. According to FIG. 24, it can be seen that when the capacitance of the capacitor C0 exceeds the capacitances of capacitors C11 and C12 (Y capacitors), the effect of reducing common mode noise increases.

Next, simulation results of the power conversion apparatuses according to the third embodiment will be described with reference to FIGS. 25 to 28. Here, we conducted simulations for a case where the power conversion apparatus 44 is the power conversion apparatus 30 of FIG. 10, the power conversion apparatus 30A of FIG. 11, or the power conversion apparatus 30B of FIG. 12.

For the simulations of FIGS. 25 to 28, the following parameters were set.

(Power conversion apparatus 44)
Capacitance of capacitor C1: 100 μF
Capacitance of capacitor C2: 10 μF
Capacitance of capacitors C5 and C6: 45 nF
Capacitance of capacitors C11 and C12: 1 nF
Capacitance of capacitor C13: 20 pF
Capacitance of capacitor C14: 10 pF
Inductance of primary windings w1a and w1b of transformer T2: 30 μH
Inductance of secondary windings w2a and w2b of transformer T2: 6.6 μH
Coupling coefficient of transformer T2: 0.94
Switching frequency of switching elements S1 and S2: 200 kHz For the simulations of FIGS. 25 to 28, the same parameters of a DC power supply apparatus 41, an input filter 43, an output filter 45, and a load apparatus 46 were set as those of the cases of FIGS. 18 to 21.

Figure 25:
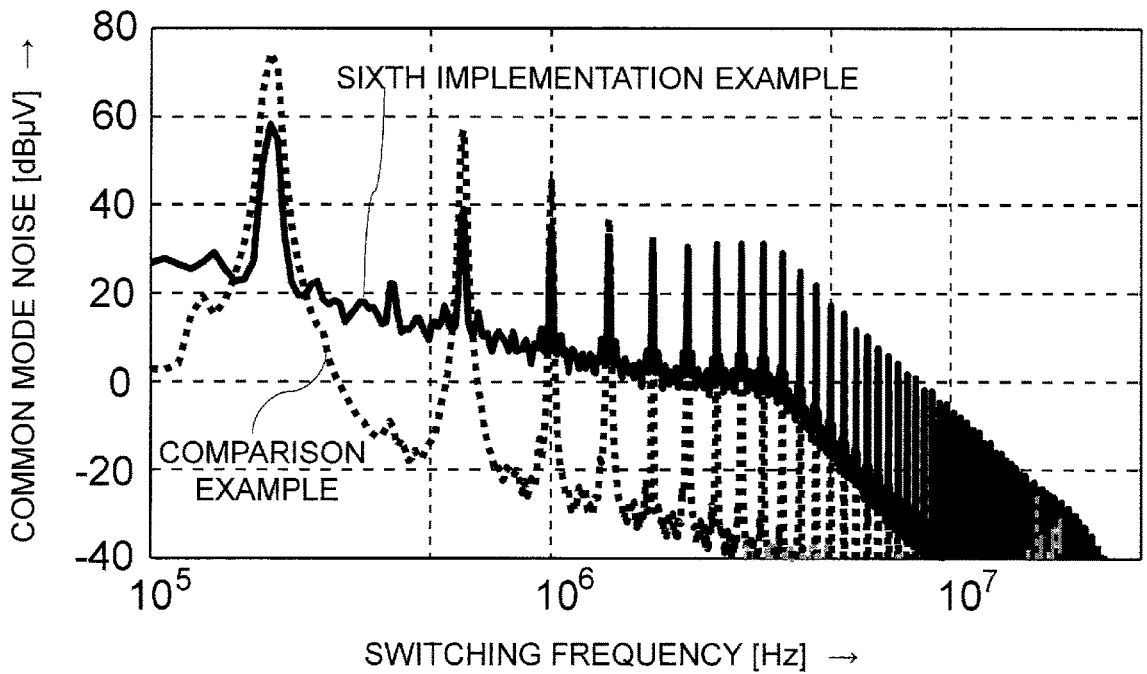
FIG. 25 is a graph illustrating frequency characteristics of common mode noise occurring in a power unit including a power conversion apparatus according to a sixth implementation example.

FIG. 25 is a graph illustrating frequency characteristics of common mode noise occurring in a power unit including a power conversion apparatus according to a sixth implementation example. Referring to FIG. 25, the sixth implementation example illustrates a case where a power conversion apparatus 44 is the power conversion apparatus 30 of FIG. 10, and the capacitance of a capacitor C0 is set to 100 nF. In addition, referring to FIG. 25, a comparison example illustrates a case where the capacitor C0 is removed. According to FIG. 25, it can be seen that common mode noise can be reduced by 16.2 dB at the switching frequency of 200 kHz.

Figure 26:
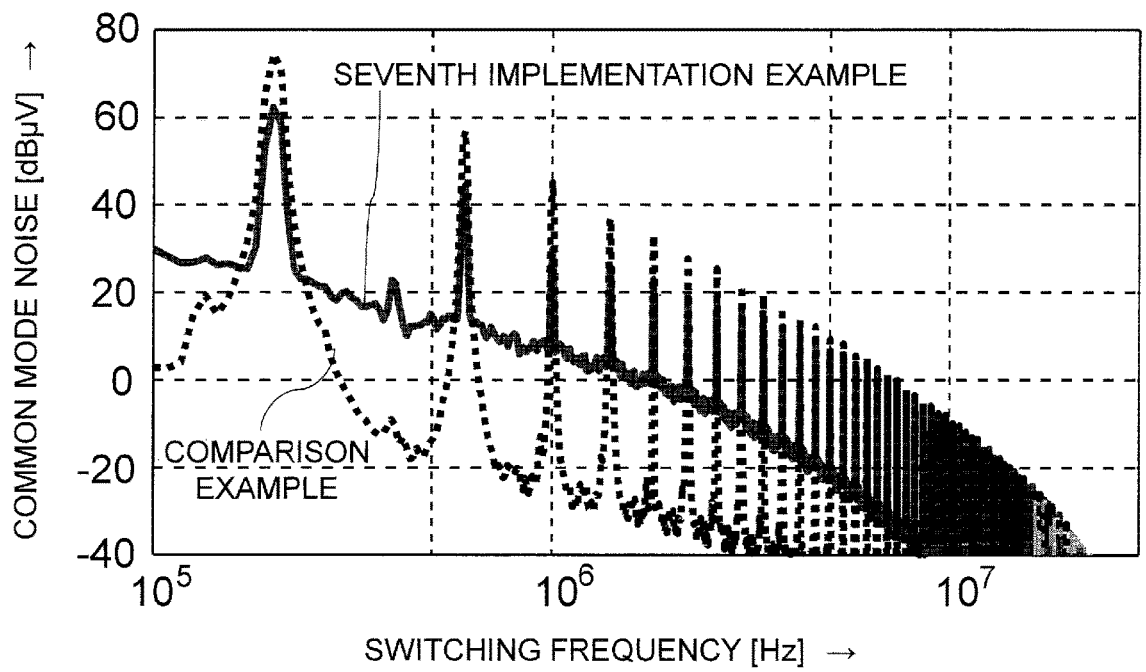
FIG. 26 is a graph illustrating frequency characteristics of common mode noise occurring in a power unit including a power conversion apparatus according to a seventh implementation example.

FIG. 26 is a graph illustrating frequency characteristics of common mode noise occurring in a power unit including a power conversion apparatus according to a seventh implementation example. Referring to FIG. 26, the seventh implementation example illustrates a case where a power conversion apparatus 44 is the power conversion apparatus 30A of FIG. 11, the capacitance of a capacitor C0 is set to 100 nF, and the resistance of a resistor R0 is set to 50Ω. In addition, referring to FIG. 26, a comparison example illustrates a case where the capacitor C0 and the resistor R0 are removed. According to FIG. 26, it can be seen that common mode noise can be reduced by 12.2 dB at the switching frequency of 200 kHz.

Figure 27:
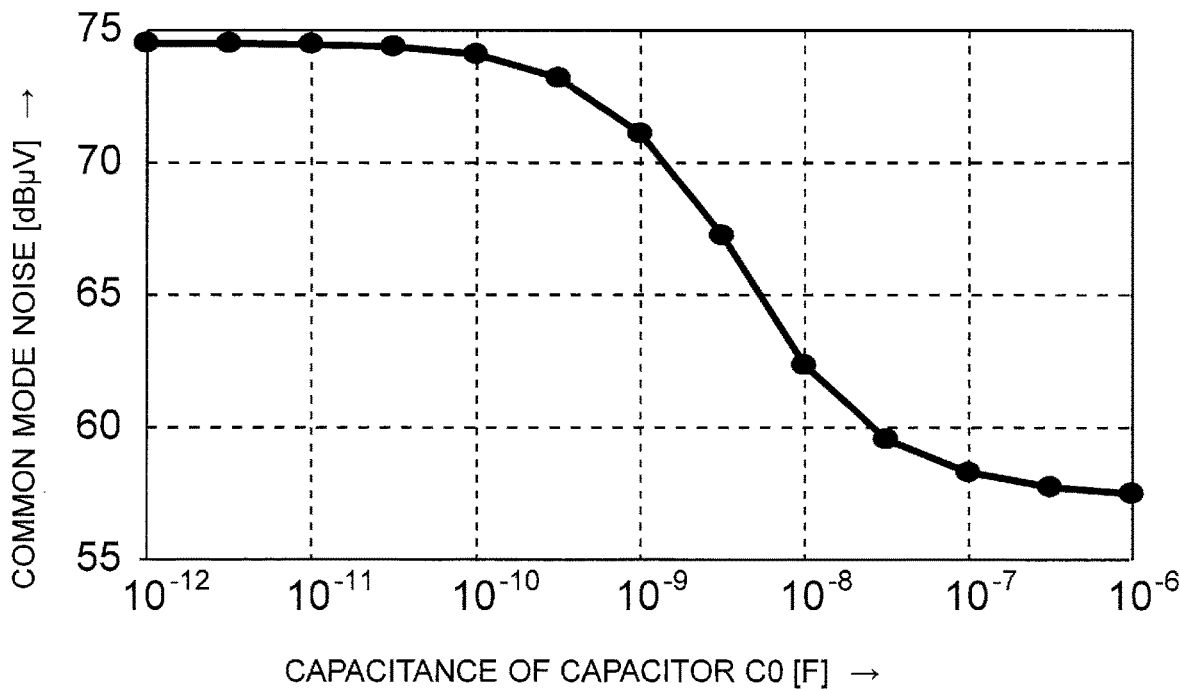
FIG. 27 is a graph illustrating the characteristics of common mode noise occurring in the power unit including the power conversion apparatus according to the seventh implementation example, with respect to the capacitance of a capacitor C0 of the power unit.

FIG. 27 is a graph illustrating the characteristics of common mode noise occurring in the power unit including the power conversion apparatus according to the seventh implementation example, with respect to the capacitance of the capacitor C0 of the power unit. FIG. 27 illustrates a case where the power conversion apparatus 44 is the power conversion apparatus 30A of FIG. 11, the capacitance of the capacitor C0 is changed over 1 pF to 1 μF, and the resistance of the resistor R0 is set to 10Ω. According to FIG. 27, it can be seen that when the capacitance of the capacitor C0 exceeds the capacitances of capacitors C11 and C12 (Y capacitors), the effect of reducing common mode noise increases.

Figure 28:
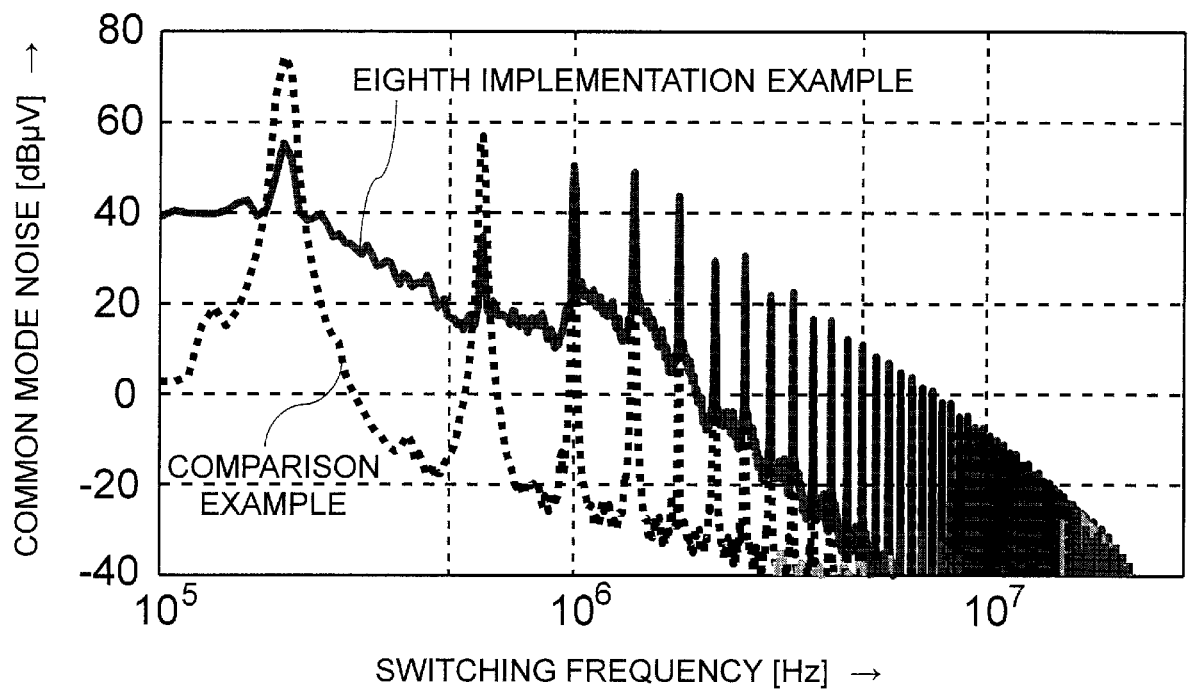
FIG. 28 is a graph illustrating frequency characteristics of common mode noise occurring in a power unit including a power conversion apparatus according to an eighth implementation example.

FIG. 28 is a graph illustrating frequency characteristics of common mode noise occurring in a power unit including a power conversion apparatus according to an eighth implementation example. Referring to FIG. 28, the eighth implementation example illustrates a case where a power conversion apparatus 44 is the power conversion apparatus 30B of FIG. 12, the capacitance of a capacitor C0 is set to 100 nF, the resistance of a resistor R0 is set to 10Ω, and the inductance of an inductor L0 is set to 6.4 pH. In addition, referring to FIG. 28, a comparison example illustrates a case where the capacitor C0, the resistor R0, and the inductor L0 are removed. According to FIG. 28, it can be seen that common mode noise can be reduced by 19.1 dB at the switching frequency of 200 kHz. In addition, according to FIG. 28, although common mode noise can be effectively reduced only in limited frequency bands, it can be more effectively reduced in a specific frequency band.

SUMMARY OF EMBODIMENTS

A power conversion apparatus according to a first aspect of the present disclosure is configured as follows.

According to the first aspect of the present disclosure, a power conversion apparatus is provided with a transformer, a primary circuit, and a secondary circuit. The primary circuit is configured as an unbalanced circuit, which is connected to a primary winding of the transformer, has a primary positive bus and a primary negative bus, and includes at least one switching element. The secondary circuit is configured as a balanced circuit, which is connected to a secondary winding of the transformer, has a secondary positive bus and a secondary negative bus, and includes a plurality of switching elements. The power conversion apparatus is further provided with a first capacitor connected between a center tap of the secondary winding of the transformer, and one of the primary positive bus and the primary negative bus.

According to the first aspect of the present disclosure, the power conversion apparatus is further provided with a ground conductor. The first capacitor has a capacitance larger than a capacitance between the ground conductor, and the primary positive bus and the primary negative bus.

According to the first aspect of the present disclosure, the power conversion apparatus is further provided with a resistor. The center tap of the secondary winding of the transformer is connected to one of the primary positive bus and the primary negative bus, through the first capacitor and the resistor connected in series.

According to the first aspect of the present disclosure, the power conversion apparatus is further provided with a first inductor. The center tap of the secondary winding of the transformer is connected to one of the primary positive bus and the primary negative bus, through the first capacitor and the first inductor connected in series.

According to the first aspect of the present disclosure, the primary circuit is a half-bridge circuit including two switching elements.

According to the first aspect of the present disclosure, the secondary circuit is a full-bridge circuit including four switching elements.

According to the first aspect of the present disclosure, the primary circuit further includes a second capacitor connected between the primary winding of the transformer and the switching element of the primary circuit.

According to the first aspect of the present disclosure, the primary circuit further includes second and third inductors connected in series to the second capacitor, and a third capacitor connected in parallel to the third inductor.

A power conversion apparatus according to a second aspect of the present disclosure is configured as follows.

According to the second aspect of the present disclosure, a power conversion apparatus is provided with a transformer, a primary circuit, and a secondary circuit. The primary circuit is configured as a balanced circuit, which is connected to a primary winding of the transformer, has a primary positive bus and a primary negative bus, and includes a plurality of switching elements. The secondary circuit is configured as an unbalanced circuit, which is connected to a secondary winding of the transformer, has a secondary positive bus and a secondary negative bus, and includes at least one switching element. The power conversion apparatus is further provided with a first capacitor connected between a center tap of the primary winding of the transformer, and one of the secondary positive bus and the secondary negative bus.

According to the second aspect of the present disclosure, the power conversion apparatus is further provided with a ground conductor. The first capacitor has a capacitance larger than a capacitance between the ground conductor, and the primary positive bus and the primary negative bus.

According to the second aspect of the present disclosure, the power conversion apparatus is further provided with a resistor. The center tap of the primary winding of the transformer is connected to one of the secondary positive bus and the secondary negative bus, through the first capacitor and the resistor connected in series.

According to the second aspect of the present disclosure, the power conversion apparatus is further provided with a first inductor. The center tap of the primary winding of the transformer is connected to one of the secondary positive bus and the secondary negative bus, through the first capacitor and the first inductor connected in series.

According to the second aspect of the present disclosure, the primary circuit is a full-bridge circuit including four switching elements.

According to the second aspect of the present disclosure, the secondary circuit is a half-bridge circuit including two switching elements.

According to the second aspect of the present disclosure, the primary circuit further includes second and third capacitors connected between both ends of the primary winding of the transformer, and the switching elements of the primary circuit, respectively.

A power conversion apparatus according to a third aspect of the present disclosure is configured as follows.

According to the third aspect of the present disclosure, a power conversion apparatus is provided with a transformer, a primary circuit, and a secondary circuit. The primary circuit is configured as a balanced circuit, which is connected to a primary winding of the transformer, has a primary positive bus and a primary negative bus, and includes a plurality of switching elements. The secondary circuit is configured as a balanced circuit, which is connected to a secondary winding of the transformer, has a secondary positive bus and a secondary negative bus, and includes a plurality of switching elements. The power conversion apparatus is further provided with a first capacitor connected between a center tap of the primary winding of the transformer, and a center tap of the secondary winding of the transformer.

According to the third aspect of the present disclosure, the power conversion apparatus is further provided with a ground conductor. The first capacitor has a capacitance larger than a capacitance between the ground conductor, and the primary positive bus and the primary negative bus.

According to the third aspect of the present disclosure, the power conversion apparatus is further provided with a resistor. The center tap of the primary winding of the transformer is connected to the center tap of the secondary winding of the transformer, through the first capacitor and the resistor connected in series.

According to the third aspect of the present disclosure, the power conversion apparatus is further provided with a first inductor. The center tap of the primary winding of the transformer is connected to the center tap of the secondary winding of the transformer, through the first capacitor and the first inductor connected in series.

According to the third aspect of the present disclosure, the primary circuit is a full-bridge circuit including four transistors as the plurality of switching elements.

According to the third aspect of the present disclosure, the secondary circuit is a full-bridge circuit including four diodes or four transistors as the plurality of switching elements.

According to the third aspect of the present disclosure, the primary circuit further includes second and third capacitors connected between both ends of the primary winding of the transformer, and the switching elements of the primary circuit, respectively.

According to the third aspect of the present disclosure, the secondary circuit further includes second and third capacitors connected between both ends of the secondary winding of the transformer, and the switching elements of the secondary circuit, respectively.

INDUSTRIAL APPLICABILITY

The power conversion apparatus according to the aspect of the present disclosure is applicable to, for example, an onboard charger, an onboard DC/DC converter, and the like.

REFERENCE SIGNS LIST 10, 10A to 10D, 20, 20A to 20C, 30, 30A to 30C: POWER CONVERSION APPARATUS
11, 11C, 21, 31: PRIMARY CIRCUIT
12, 22, 32, 32C: SECONDARY CIRCUIT
13, 13A, 13B, 23, 23A, 23B, 33, 33A, 33B: COUPLING CIRCUIT
41: DC POWER SUPPLY APPARATUS
42: STABILIZATION CIRCUIT
43: INPUT FILTER
44: POWER CONVERSION APPARATUS
45: OUTPUT FILTER
46: LOAD APPARATUS
B1p, B2p: POSITIVE BUS
B1n, B2n: NEGATIVE BUS
C0, C1 to C8, C11 to C14, C21, C22: CAPACITOR
L0, L21, L22: INDUCTOR
R0: RESISTOR
S1 to S8, S5A to SBA: SWITCHING ELEMENT
T1, T2: TRANSFORMER

The invention claimed is:

1. A power conversion apparatus comprising a transformer, a primary circuit, and a secondary circuit,
wherein the primary circuit is connected to a primary winding of the transformer, has a primary positive bus and a primary negative bus, and includes at least one switching element,
wherein the secondary circuit is connected to a secondary winding of the transformer, has a secondary positive bus and a secondary negative bus, and includes at least one switching element,
wherein the power conversion apparatus further comprises a coupling circuit including at least a first capacitor, and
wherein the power conversion apparatus is characterized by any one of:
(A) being configured such that the primary circuit is an unbalanced circuit and the secondary circuit is a balanced circuit, and having the coupling circuit connected between a center tap of the secondary winding of the transformer, and one of the primary positive bus and the primary negative bus, the center tap of the secondary winding not having any other conductive path to the secondary circuit than the secondary winding,
(B) being configured such that the primary circuit is a balanced circuit and the secondary circuit is an unbalanced circuit, and having the coupling circuit connected between a center tap of the primary winding of the transformer, and one of the secondary positive bus and the secondary negative bus, the center tap of the primary winding not having any other conductive path to the primary circuit than the primary winding, and
(C) being configured such that the primary circuit is a balanced circuit and the secondary circuit is a balanced circuit, and having the coupling circuit connected between a center tap of the primary winding of the transformer, and a center tap of the secondary winding of the transformer, the center tap of the primary winding not having any other conductive path to the primary circuit than the primary winding, and the center tap of the secondary winding not having any other conductive path to the secondary circuit than the secondary winding.

2. The power conversion apparatus as claimed in claim 1 further comprising a ground conductor,
wherein the first capacitor has a capacitance larger than a capacitance between the ground conductor, and the primary positive bus and the primary negative bus.

3. The power conversion apparatus as claimed in claim 1, wherein the coupling circuit further includes a resistor connected in series to the first capacitor.

4. The power conversion apparatus as claimed in claim 1, wherein the coupling circuit further includes a first inductor connected in series to the first capacitor.

5. The power conversion apparatus as claimed in claim 1, wherein, in a case where the primary circuit is the unbalanced circuit, the primary circuit is a half-bridge circuit including two switching elements.

6. The power conversion apparatus as claimed in claim 1, wherein, in a case where the primary circuit is the unbalanced circuit, the primary circuit further includes a second capacitor connected between the primary winding of the transformer and the switching element of the primary circuit.

7. The power conversion apparatus as claimed in claim 6, wherein, in a case where the primary circuit is the unbalanced circuit, the primary circuit further includes second and third inductors connected in series to the second capacitor, and a third capacitor connected in parallel to the third inductor.

8. The power conversion apparatus as claimed in claim 1, wherein, in a case where the primary circuit is the balanced circuit, the primary circuit is a full-bridge circuit including four switching elements.

9. The power conversion apparatus as claimed in claim 1, wherein, in a case where the primary circuit is the balanced circuit, the primary circuit further includes second and third capacitors connected between the switching element of the primary circuit, and both ends of the primary winding of the transformer, respectively.

10. The power conversion apparatus as claimed in claim 1, wherein, in a case where the secondary circuit is the unbalanced circuit, the secondary circuit is a half-bridge circuit including two switching elements.

11. The power conversion apparatus as claimed in claim 1, wherein, in a case where the secondary circuit is the balanced circuit, the secondary circuit is a full-bridge circuit including four switching elements.

12. The power conversion apparatus as claimed in claim 1, wherein, in a case where the secondary circuit is the balanced circuit, the secondary circuit further includes fourth and fifth capacitors connected between the switching element of the secondary circuit, and both ends of the secondary winding of the transformer, respectively.

* * * * *